United States Patent
Ivanov et al.

(10) Patent No.: US 11,846,992 B2
(45) Date of Patent: Dec. 19, 2023

(54) ELECTRONIC DEVICE INCLUDING FLEXIBLE DISPLAY

(71) Applicant: Samsung Electronics Co., Ltd., Gyeonggi-do (KR)

(72) Inventors: Igor Ivanov, Gyeonggi-do (KR); Seonho Hwang, Gyeonggi-do (KR); Hyungsok Yeo, Gyeonggi-do (KR); Oleg Feygenson, Gyeonggi-do (KR); Minwoo Yoo, Gyeonggi-do (KR); Changryong Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/697,209

(22) Filed: Mar. 17, 2022

(65) Prior Publication Data
US 2022/0308632 A1 Sep. 29, 2022

Related U.S. Application Data

(63) Continuation of application No. PCT/KR2022/003031, filed on Mar. 3, 2022.

(30) Foreign Application Priority Data

Mar. 24, 2021 (KR) .................. 10-2021-0037952

(51) Int. Cl.
*G06F 1/16* (2006.01)
(52) U.S. Cl.
CPC .......... *G06F 1/1652* (2013.01); *G06F 1/1615* (2013.01); *G06F 1/1647* (2013.01); *G06F 1/1675* (2013.01)
(58) Field of Classification Search
CPC ........ G06F 1/16; G06F 1/1616; G06F 1/1626; G06F 1/1628; G06F 1/1641;
(Continued)

(56) References Cited

U.S. PATENT DOCUMENTS

| 7,453,416 B2 * | 11/2008 | Muramatsu | G06F 1/1647 434/317 |
| 2003/0020701 A1 * | 1/2003 | Nakamura | G06F 1/1647 345/204 |

(Continued)

FOREIGN PATENT DOCUMENTS

| CN | 111045484 A | 4/2020 |
| EP | 3 444 797 A1 | 2/2019 |

(Continued)

OTHER PUBLICATIONS

International Search Report dated Jun. 3, 2022.
Written Opinion dated Jun. 3, 2022.

*Primary Examiner* — Adrian S Wilson
*Assistant Examiner* — Gage Crum
(74) *Attorney, Agent, or Firm* — Cha & Reiter, LLC

(57) ABSTRACT

An electronic device is disclosed, including a binder structure, connection cylinders detachable coupled to the binder structure and rotatable therein, a first electronic part disposed within a space formed by the connection cylinders, a display module detachably coupled to at least one cylinder and electrically connected to the electronic part, wherein the display module includes a first sheet, a second sheet, a connection unit connecting ends of the first and second sheets, a first flexible display supported by the first sheet, and second flexible display supported by the second sheet, and a sheet fixing member disposed in the internal space of the connection cylinder connecting other ends of the first and second sheets, wherein the first sheet and second sheet are configured to slip relative to one another, and both displays are electronically connected to the first electronic part through the sheet fixing member.

20 Claims, 21 Drawing Sheets

(58) Field of Classification Search
CPC .... G06F 1/1647; G06F 1/1652; G06F 1/1677; G06F 1/1615; G06F 1/1643; G06F 1/1675; Y10S 345/901; G09F 9/30; G09F 9/301; H04M 1/04
See application file for complete search history.

(56) References Cited

U.S. PATENT DOCUMENTS

| | | | |
|---|---|---|---|
| 2006/0192726 A1 | 8/2006 | Huitema et al. | |
| 2007/0195009 A1* | 8/2007 | Yamamoto | G06F 3/0412 345/1.1 |
| 2009/0000830 A1* | 1/2009 | Kim | G06F 15/0283 178/18.03 |
| 2010/0277443 A1* | 11/2010 | Yamazaki | G06F 1/1652 345/204 |
| 2013/0076614 A1* | 3/2013 | Ive | H04M 1/0283 710/15 |
| 2013/0223005 A1* | 8/2013 | Smith | G06F 1/1628 361/679.55 |
| 2014/0062838 A1* | 3/2014 | You | G06F 3/1423 345/3.1 |
| 2016/0014881 A1 | 1/2016 | Shin et al. | |
| 2016/0148819 A1 | 5/2016 | Heuck et al. | |
| 2017/0023978 A1 | 1/2017 | Cho et al. | |
| 2017/0071066 A1* | 3/2017 | Cho | H05K 5/0217 |
| 2017/0270835 A1* | 9/2017 | Yang | H10K 59/12 |
| 2017/0357289 A1 | 12/2017 | Ahn | |
| 2017/0359914 A1* | 12/2017 | Yanagisawa | H05K 5/0086 |
| 2017/0364220 A1* | 12/2017 | Karl | G06F 3/017 |
| 2018/0135674 A1* | 5/2018 | Cosgrove | F16B 5/07 |
| 2019/0053387 A1 | 2/2019 | Choi et al. | |
| 2019/0069421 A1 | 2/2019 | Lee | |
| 2021/0034110 A1 | 2/2021 | Hamburgen et al. | |

FOREIGN PATENT DOCUMENTS

| | | | |
|---|---|---|---|
| JP | 2009-8955 A | | 1/2009 |
| JP | 2009008955 A | * | 1/2009 |
| KR | 10-2005-0109613 A | | 11/2005 |
| KR | 10-2017-0013540 A | | 2/2017 |
| KR | 10-2017-0139740 A | | 12/2017 |
| KR | 10-2018-0015225 A | | 2/2018 |
| KR | 10-2019-0079128 A | | 7/2019 |
| WO | 2019/126601 A1 | | 6/2019 |

* cited by examiner

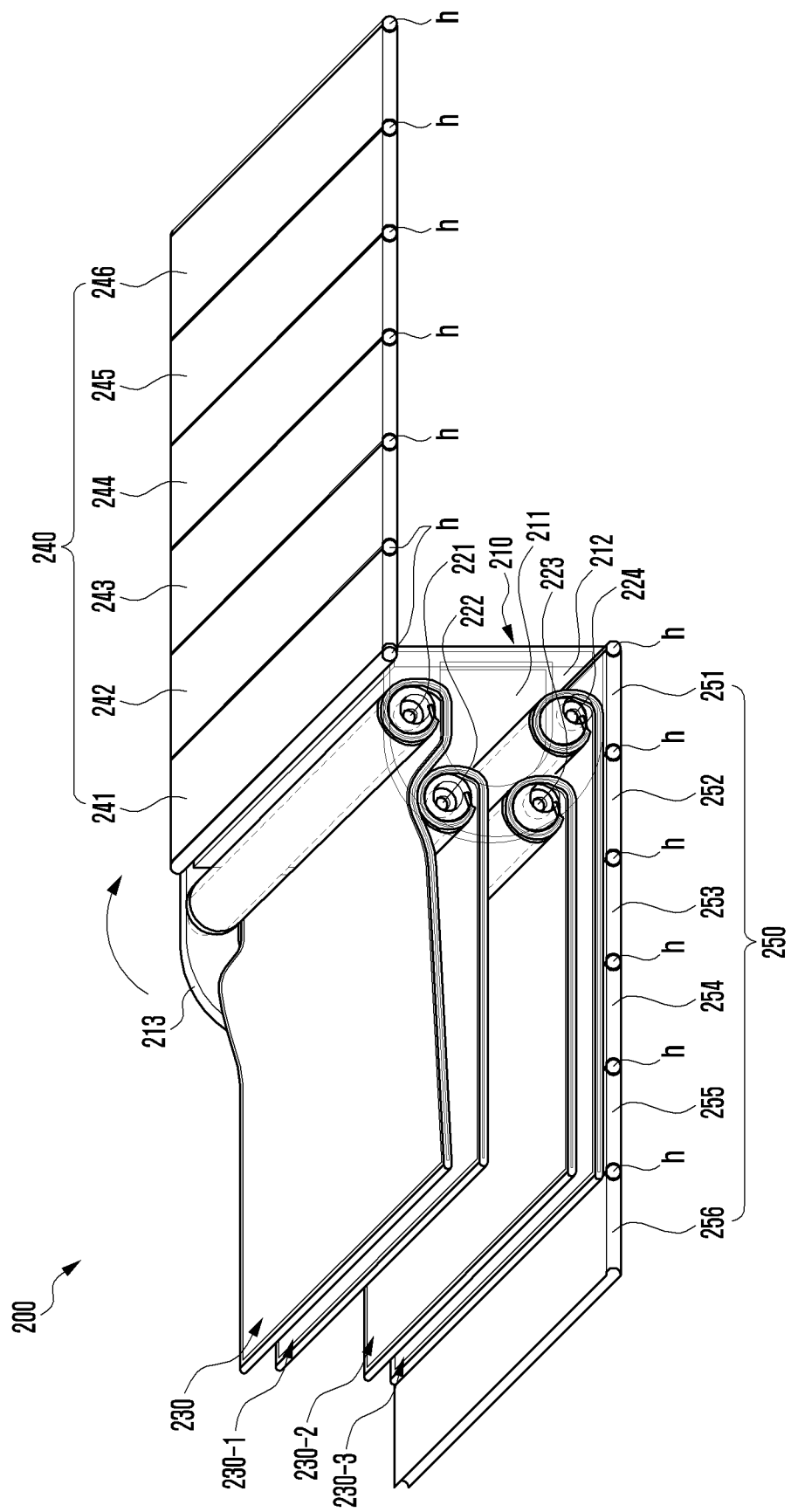

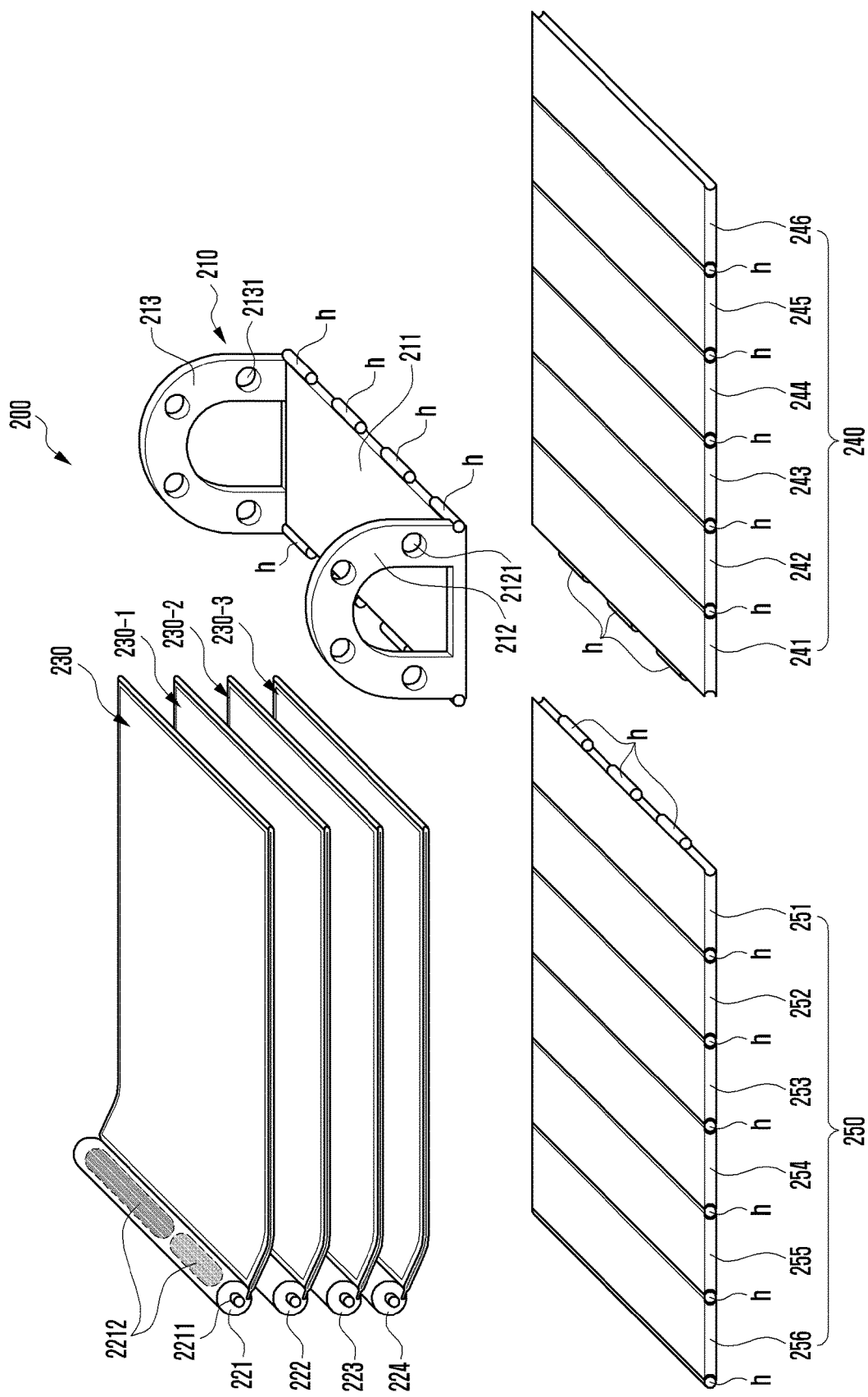

ELECTRONIC DEVICE INCLUDING FLEXIBLE DISPLAY

CROSS-REFERENCE TO RELATED APPLICATION(S)

This application is a continuation of International Application No. PCT/KR2022/003031, filed on Mar. 3, 2022, which claims priority to Korean Patent Application No. 10-2021-0037952, filed on Mar. 24, 2021 in the Korean Intellectual Property Office, the disclosures of which are herein incorporated by reference.

BACKGROUND

Technical Field

Certain embodiments of the present disclosure relate to an electronic device including a flexible display.

Description of Related Art

In recent times, portable electronic devices such as smartphones have been designed to have increasing slimness and stiffness, in addition to implementing a diversity of functions and applications. Furthermore, whereas previously, these devices were usually uniformly rectangular in shape, now these devices have begun incorporating a greater diversity of shapes. For example, some such devices are now deformable and can be manipulated to be changed into various shapes. With such devices, because of the deformable structure, portability may be maintained even as ever-larger flexible displays are equipped therein. In order to implement the deformation capability, various forms of the flexible display may be utilized, as supported by rigid housings which are coupled in ways that allow bending, rolling, and other such deformations.

An example electronic device may include a plurality of housings coupled together through hinges, with a flexible display disposed over a surface thereof, thus allowing a variety of physical configurations. For example, a rollable-type electronic device may be implemented, in which the flexible display may be variable in the actual visible display area, as based on changes to the configuration of the housings. In other examples, a bendable electronic device may be implemented, in which the flexible display may be varied in shape according to bending of two or more housings about a hinge.

However, rollable electronic devices are often limited in the amount of information displayable while in the rolled-state, because much of the actual display may be stowed within the housing (e.g., rolled) and thus unavailable for display to a user. Similarly, foldable-type electronic devices may encounter a similar issue, in which the folded configuration of the device may hide most if not all of the flexible display from the user.

SUMMARY

Certain embodiments of the present disclosure may provide an electronic device including a flexible display, which can efficiently provide a large amount of information to a user regardless of a present physical configuration.

Certain embodiments may provide an electronic device including a flexible display, which may improve user convenience.

However, difficulties to be solved by the present disclosure are not limited to the aforementioned objects, and may be variously extended without departing from the scope of the present disclosure.

According to certain embodiments, an electronic device may include a binder structure, a plurality of connection cylinders coupled with the binder structure so as to be separable from the binder structure, and rotatable within the binder structure, at least one first electronic part disposed in an internal space defined by the plurality of connection cylinders, at least one display module coupled with at least one connection cylinder of the plurality of connection cylinders so as to be separable from the at least one connection cylinder, and electrically connected to the at least one first electronic part, wherein the at least one display module comprises a first sheet including a first surface facing a first direction and a second surface opposite to the first surface, a second sheet including a third surface coupled with the second surface, and a fourth surface opposite to the third surface, a connection unit connecting one end of the first sheet and one end of the second sheet, a first flexible display supported by the first sheet, at least partly visible to an exterior of the device from at least a part of the first surface of the first sheet, a second flexible display supported by the second sheet, at least partly visible to an exterior of the device from at least a part of the fourth surface of the second sheet, a sheet fixing member fixing another end of the first sheet and another end of the second sheet, and disposed in the internal space of the connection cylinder so as to be attachable and detachable therefrom, wherein the first sheet is coupled to the second sheet so as to allow slippage therebetween in a second direction perpendicular to a first direction, and wherein the first flexible display and the second flexible display are electrically connected to the at least one first electronic part through the sheet fixing member.

According to certain embodiments, an electronic device may include a binder structure, a plurality of connection cylinders coupled with the binder structure so as to be separable from the binder structure, and rotatable within the binder structure, at least one first electronic part disposed in an internal space defined by the plurality of connection cylinders, at least one display module coupled with at least one cylinder of the plurality of connection cylinders so as to be separable from the at least one cylinder, and electrically connected to the at least one first electronic part, wherein the at least one display module comprises a first sheet including a first surface facing a first direction, and a second surface opposite to the first surface, a second sheet including a third surface coupled with the second surface, and a fourth surface opposite to the third surface, a connection unit connecting one end of the first sheet and one end of the second sheet, a flexible display supported by at least a part of the fourth surface, and at least partly viewable to an exterior of the electronic device, and a sheet fixing member fixing another end of the first sheet and another end of the second sheet, and disposed in the internal space of the connection cylinder so as to be attachable thereto and detachable therefrom, wherein the first sheet is coupled the second sheet so as to allow slippage therebetween in a second direction perpendicular to the first direction, and wherein the flexible display is electrically connected to the at least one first electronic part through the sheet fixing member.

An electronic device, according to certain embodiments of the present disclosure, can provide an electronic book function approximating a plurality of pages functionally operative with one another via coupling in a binder-type structure. This may improve user convenience via the usage of a plurality of display modules, which are separable from the binder structure, and also individually rollable. in such a way as to be In addition, various effects directly or indirectly understood through this document may be provided.

BRIEF DESCRIPTION OF THE DRAWINGS

In relation to the description of the drawings, the same or similar reference numerals may be used with respect to the same or similar constituent elements, in which in which:

FIGS. 2A, 2B, 2C and 2D are perspective views of the electronic device illustrating various deformation states according to certain embodiments of the present disclosure.

FIG. 3 is a separated perspective view of the electronic device according to certain embodiments of the present disclosure.

DETAILED DESCRIPTION

Figure 1:
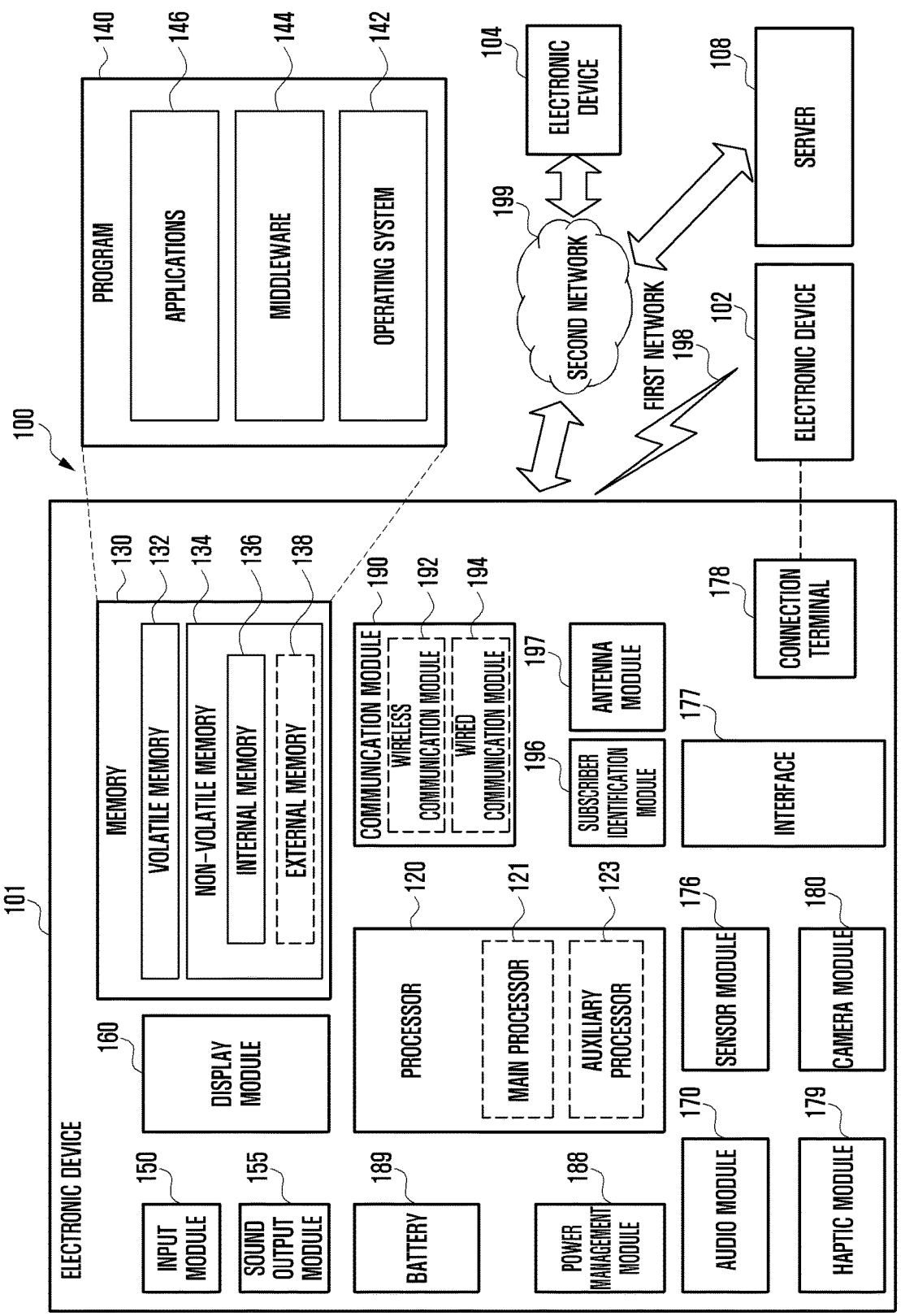
FIG. 1 is a block diagram of an electronic device within a network environment according to certain embodiments of the present disclosure.

FIG. 1 is a block diagram illustrating an example electronic device in a network environment according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In certain embodiments, at least one of the components (e.g., the connecting terminal 178) may be omitted from the electronic device 101, or one or more other components may be added in the electronic device 101. In certain embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A to 2D are perspective views of the electronic device illustrating various deformation states according to certain embodiments of the present disclosure. FIG. 3 is a separated perspective view of the electronic device according to certain embodiments of the present disclosure.

Figure 2A:
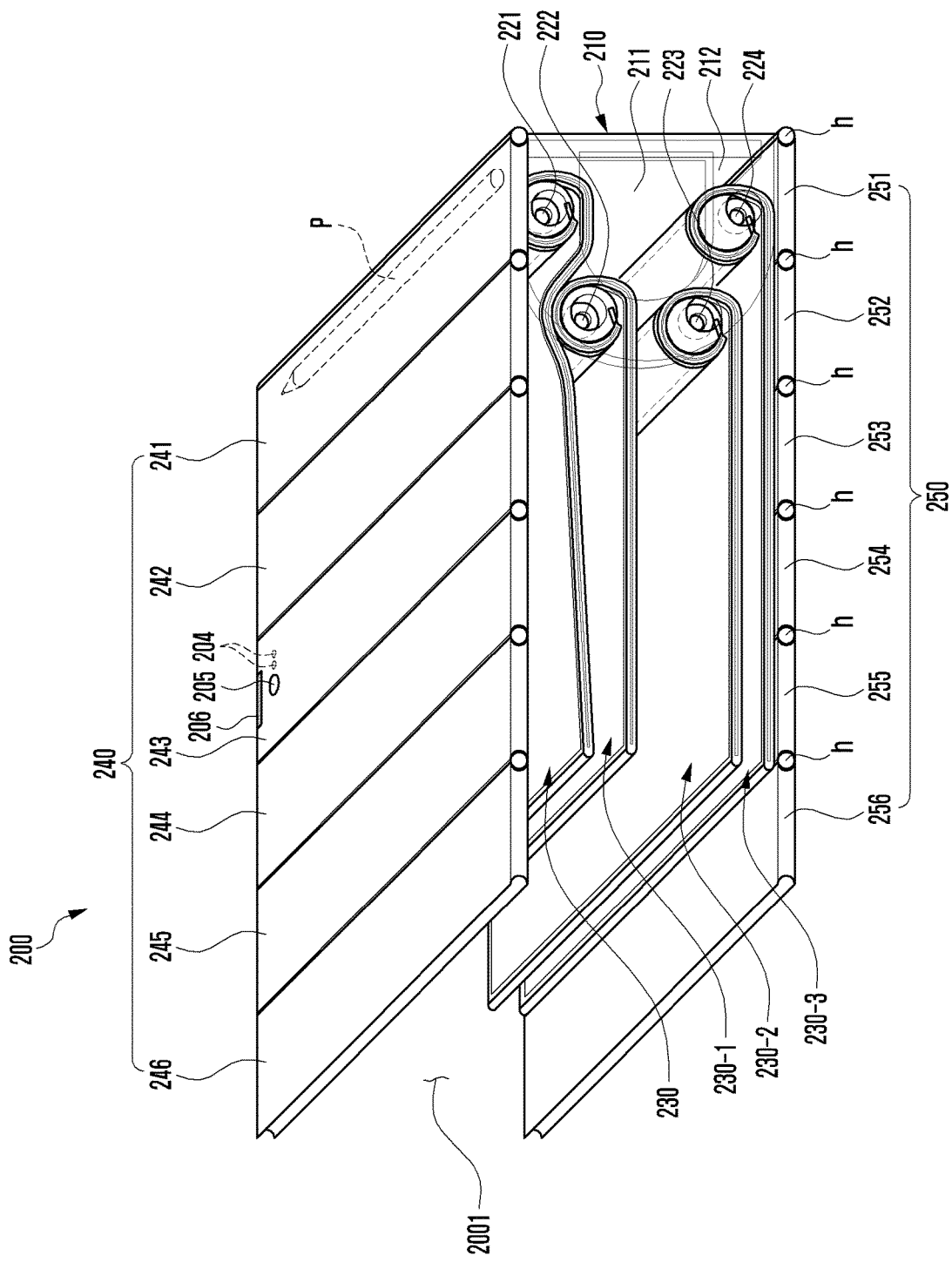

An electronic device 200 of FIGS. 2A to 3 may be similar to at least a part of the electronic device 101 of FIG. 1 or may further include other embodiments of the electronic device.

Referring to FIGS. 2A to 3, the electronic device 200 may include a binder structure 210, a plurality of connection cylinders 221, 222, 223, and 224 coupled with the binder structure 210 in a way so as to be attachable thereto and detachable therefrom, and a plurality of display modules 230, 230-1, 230-2, and 230-3 coupled with the plurality of connection cylinders 221, 222, 223, and 224 in a way so as to be attachable thereto and detachable therefrom. According to an embodiment, the binder structure, the plurality of connection cylinders 221, 222, 223, and 224 and/or the plurality of display modules 230, 230-1, 230-2, and 230-3 may functionally interoperate via electrical interconnection with one another. According to an embodiment, the electronic device 200 may include a first cover assembly 240 and a second cover assembly 250 coupled with the binder structure 210 in such a way as to be foldable. According to an embodiment, the plurality of display modules 230, 230-1, 230-2, and 230-3 coupled with the binder structure 210 may at least partially cover the plurality of display modules 230, 230-1, 230-2, and 230-3 coupled with the binder structure 210 through structural deformation of the first cover assembly 240 and the second cover assembly 250 (e.g., for protection).

According to certain embodiments, the binder structure 210 may include a body 211, a first support unit 212 coupled with one end of the body 211 and including first through holes 2121, and a second support unit 213 coupled with the other end of the body 211 and including second through holes 2131. In an embodiment, the first support unit 212 and the second support unit 213 may be integrally formed with the body 211. According to an embodiment, the body 211 and the support units 212 and 213 may accommodate at least one electronic part (e.g., at least one electronic part 2111 in FIG. 9) by inclusion of an internal space (e.g., the internal space 2101 in FIG. 9). According to an embodiment, the at least one electronic part 2111 may include at least one of a substrate, at least one processor, at least one battery, a display driving circuit, at least one sensor module, at least one camera module or a memory utilized for the driving of the electronic device 200.

According to certain embodiments, each of the plurality of connection cylinders 221, 222, 223, and 224 may be formed in a hollow cylindrical shape having an internal space (e.g., an internal space 2201 in FIG. 6), and may be coupled with the binder structure 210 in such a way as to be rotatable within the binder structure 210, by including a hinge shaft 2211 penetrating a first through hole 2121 formed in the first support unit 212, and a second through hole 2131 formed in the second support unit 213. According to an embodiment, the plurality of connection cylinders 221, 222, 223, and 224 may be coupled with the binder structure 210 in such a way as to be separable from the same. For example, the plurality of connection cylinders 221, 222, 223, and 224 may include a first connection cylinder 221, a second connection cylinder 222, a third connection cylinder 223 and a fourth connection cylinder 224 rotatably coupled with the through holes 2121 and 2131 of the support units 212 and 213. According to an embodiment, each of the plurality of connection cylinders 221, 222, 223, and 224 may include at least one electronic part (e.g., an electronic part 2212 in FIG. 3) disposed in an internal space thereof. According to an embodiment, the at least one electronic part 2212 may include an electrical connection structure utilized for the driving of the display modules 230, 230-1, 230-2, and 230-3 or for electrically connecting the display modules 230, 230-1, 230-2, and 230-3 and at least one electronic part disposed in the binder structure 210. According to an embodiment, the at least one electronic part 2212 may also include at least one of a substrate, at least one processor, at least one battery, a display driving circuit, at least one sensor module, at least one camera module or a memory.

According to certain embodiments, the plurality of display modules 230, 230-1, 230-2, and 230-3 may include a first display module 230 coupled with the first connection cylinder 221 in such a way as to be attachable thereto and detachable therefrom, a second display module 230-1 coupled with the second connection cylinder 222 in such a way as to be attachable thereto and detachable therefrom, a third display module 230-2 coupled with the third connection cylinder 223 in such a way as to be attachable thereto and detachable therefrom, and a fourth display module 230-3 coupled with the fourth connection cylinder 224 in such a way as to be attachable thereto and detachable therefrom. According to an embodiment, the number of plurality of display modules 230, 230-1, 230-2, and 230-3 may not be limited, and the plurality of display modules 230, 230-1, 230-2, and 230-3 may be formed to have a number corresponding to the number of connection cylinders 221, 222, 223, and 224. In an embodiment, the plurality of display modules 230, 230-1, 230-2, and 230-3 may have different sizes, and may have electrical connection structures and coupling structures compatible with the plurality of connection cylinders 221, 222, 223, and 224, respectively. For example, the first display module 230 may be compatible with any one of the second connection cylinder, the third connection cylinder or the fourth connection cylinder. The second display module, the third display module, and the fourth display module may also have electrical connection structures and coupling structures compatible with other connection cylinders 221, 222, 223, and 224, respectively.

According to certain embodiments, the first cover assembly 240 may be disposed to be foldable through a hinge device "h" (e.g., a hinge structure) disposed on one side of the body 211 of the binder structure 210. According to an embodiment, the first cover assembly 240 may include a plurality of first unit covers 241, 242, 243, 244, 245, and 246 coupled together in such a way as to be foldable through the at least one hinge device "h." According to an embodiment, the plurality of first unit covers 241, 242, 243, 244, 245, and 246 may include a first unit cover 241, a second unit cover 242, a third unit cover 243, a fourth unit cover 244, a fifth unit cover 245 and a sixth unit cover 246 coupled together in such a way as to be foldable. According to an embodiment, the second cover assembly 250 may be disposed on the other side of the body 211 of the binder structure 210 in such a way as to be foldable through the hinge device "h" between the support units 212 and 213. According to an embodiment, the second cover assembly 250 may include a plurality of second unit covers 251, 252, 253, 254, 255, and 256 coupled together in such a way as to be foldable through the at least one hinge device "h." According to an embodiment, the plurality of second unit covers 251, 252, 253, 254, 255, and 256 may include a seventh unit cover 251, an eighth unit cover 252, a ninth unit cover 253, a tenth unit cover 254, an eleventh unit cover 255 and a twelfth unit cover 256 coupled together in such a way as to be foldable. According to an embodiment, the number of unit covers 241, 242, 243, 244, 245, 246, 251, 252, 253, 254, 255, and 256 may not be limited. According to an embodiment, the number of unit covers 241, 242, 243, 244, 245, and 246 of the first cover assembly 240 and the number of unit covers 251, 252, 253, 254, 255, and 256 of the second cover assembly 250 may be different.

Figure 2C:
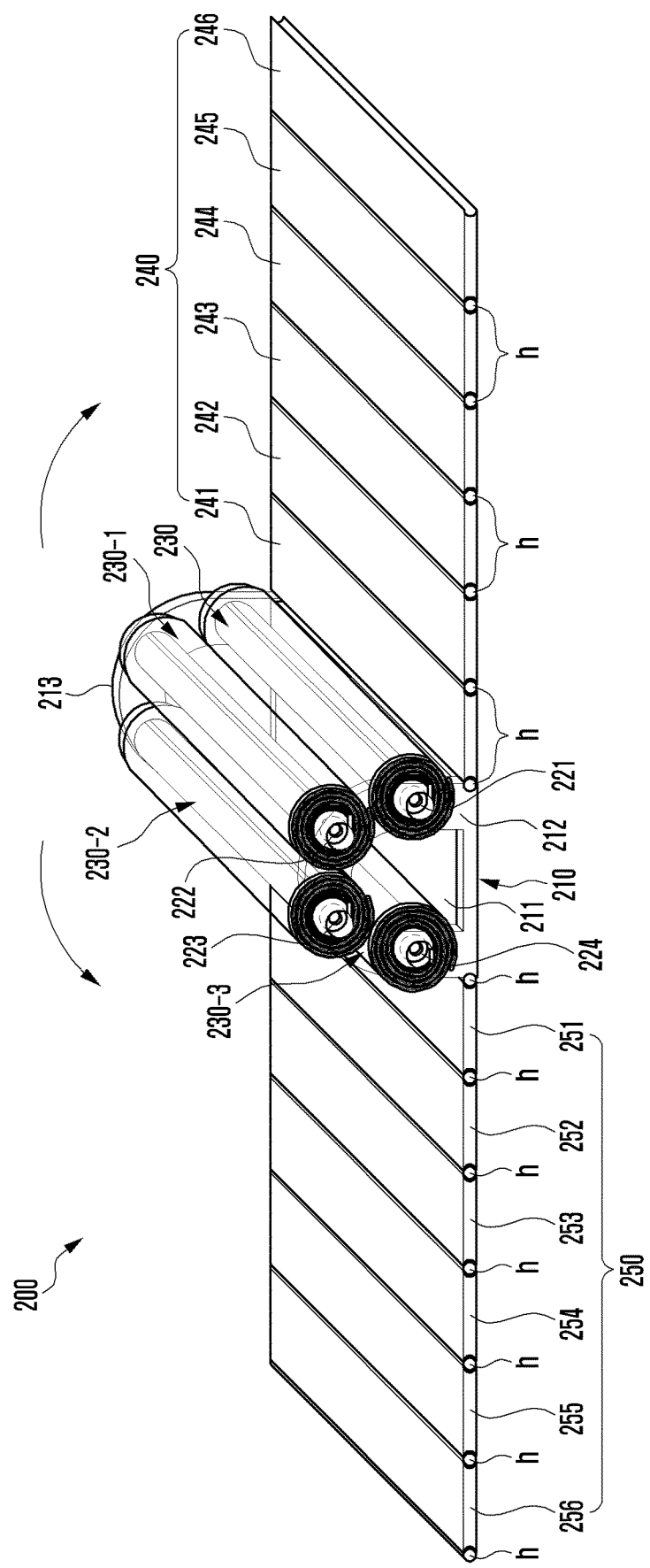
Figure 2D:
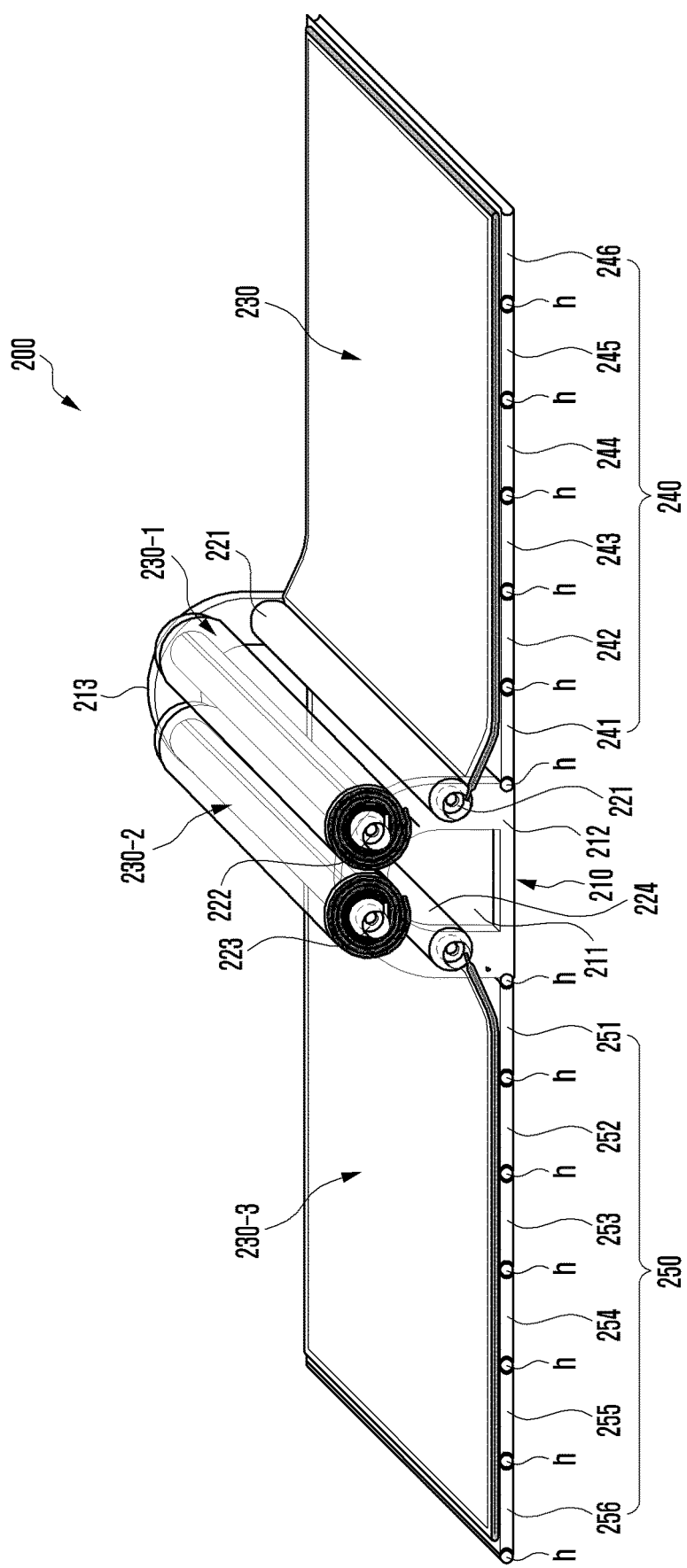

According to certain embodiments, the electronic device 200 can at least partially cover the display modules 230, 230-1, 230-2, and 230-3 coupled with the binder structure 210 (e.g., for protection thereof) through structural deformation of the first cover assembly 240 and the second cover assembly 250. For example, as illustrated in FIG. 2A, in the state in which all the unit covers 241, 242, 243, 244, 245, and 246 of the first cover assembly 240 are unrolled to form a substantially flat surface and all the unit covers 251, 252, 253, 254, 255, and 256 of the second cover assembly 250 are unrolled to form a substantially flat surface, the plurality of display modules 230, 230-1, 230-2, and 230-3 may be covered in such a way as to be generally protected through the binder structure 210 within the resultingly formed space 2001. In an embodiment, as illustrated in FIG. 2B, as the first cover assembly 240 is deformed in a state so as to be unrolled from the binder structure 210, the plurality of display modules 230, 230-1, 230-2, and 230-3 may be activated to perform a plurality of electronic page functions, such as executing an electronic book function, for example. In an embodiment, as illustrated in FIG. 2C, in the state in which both the first cover assembly 240 and the second cover assembly 250 have been unrolled from the binder structure 210, the plurality of display modules 230, 230-1, 230-2, and 230-3 may be exposed to the external environment. In such a case, the plurality of display modules 230, 230-1, 230-2, and 230-3 may be maintain in a rolled state through the corresponding connection cylinders 221, 222, 223, and 224. In an embodiment, as illustrated in FIG. 2D, in the state in which both the first cover assembly 240 and the second cover assembly 250 have been unrolled from the binder structure 210, some display modules 230-1 and 230-2 of the plurality of display modules 230, 230-1, 230-2, and 230-3 may be maintained in the rolled state through the corresponding connection cylinders 222 and 223, and the remaining some display modules 230 and 230-3 may be maintained in a flat state unrolled from the corresponding connection cylinders 221 and 224.

According to certain embodiments, the electronic device 200 may include at least one electronic part disposed in the internal space of the first cover assembly 240 and/or the second cover assembly 250. according to an embodiment, an electronic part may include at least one acoustic output device 206, at least one sensor module 204 or at least one camera module 205. In an embodiment, the electronic device 200 may include an electronic pen P disposed in the first cover assembly 240 and/or the second cover assembly 250 in such a way as to be attachable thereto and detachable therefrom (not illustrated). In such a case, at least some of the plurality of display modules 230, 230-1, 230-2, and 230-3 may include a digitizer for detecting the input of the electronic pen P. Although not illustrated, the electronic device 200 may further include an input device (e.g., a microphone), a connector port, a key input device (key button) or at least one antenna disposed through the internal spaces of the first cover assembly 240 and/or the second cover assembly 250. According to an embodiment, the at least one acoustic output device 206 may include a speaker or a receiver. According to an embodiment, the at least one sensor module 204 may include at least one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a bio sensor, a temperature sensor, an HRM sensor or a humidity sensor. In an embodiment, the electronic device 200 may be configured to have at least one of the aforementioned elements thereof omitted or to have other elements additionally included therein. In an embodiment, at least one of the aforementioned elements may be disposed in an internal space of the binder structure 210 (e.g., the internal space 2101 in FIG. 9 or an internal space (e.g., the internal space 2201 in FIG. 6) of the connection cylinders 221, 222, 223, and 224).

Figure 4:
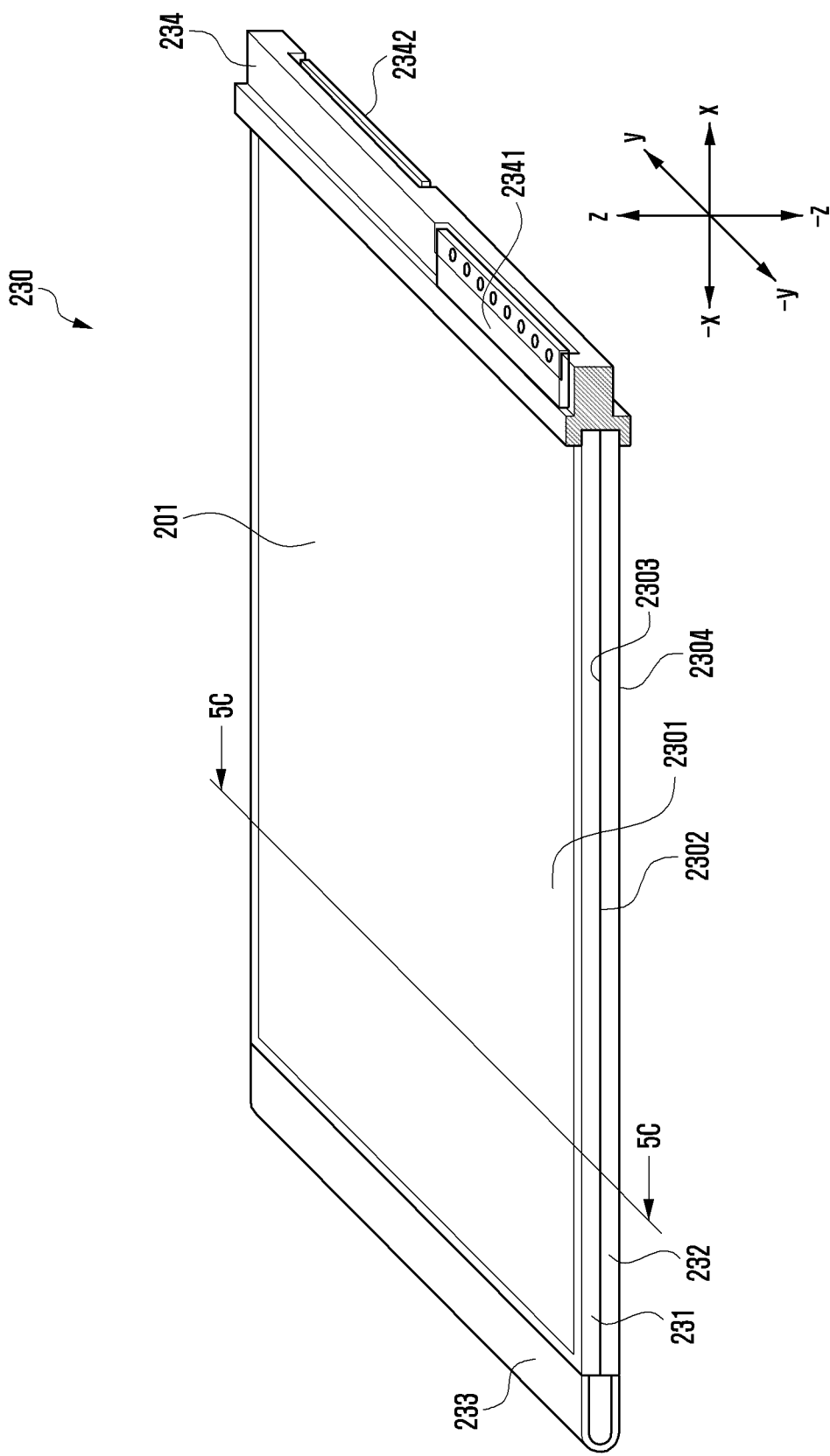
FIG. 4 is a perspective view of a display module according to certain embodiments of the present disclosure.
Figure 5A:
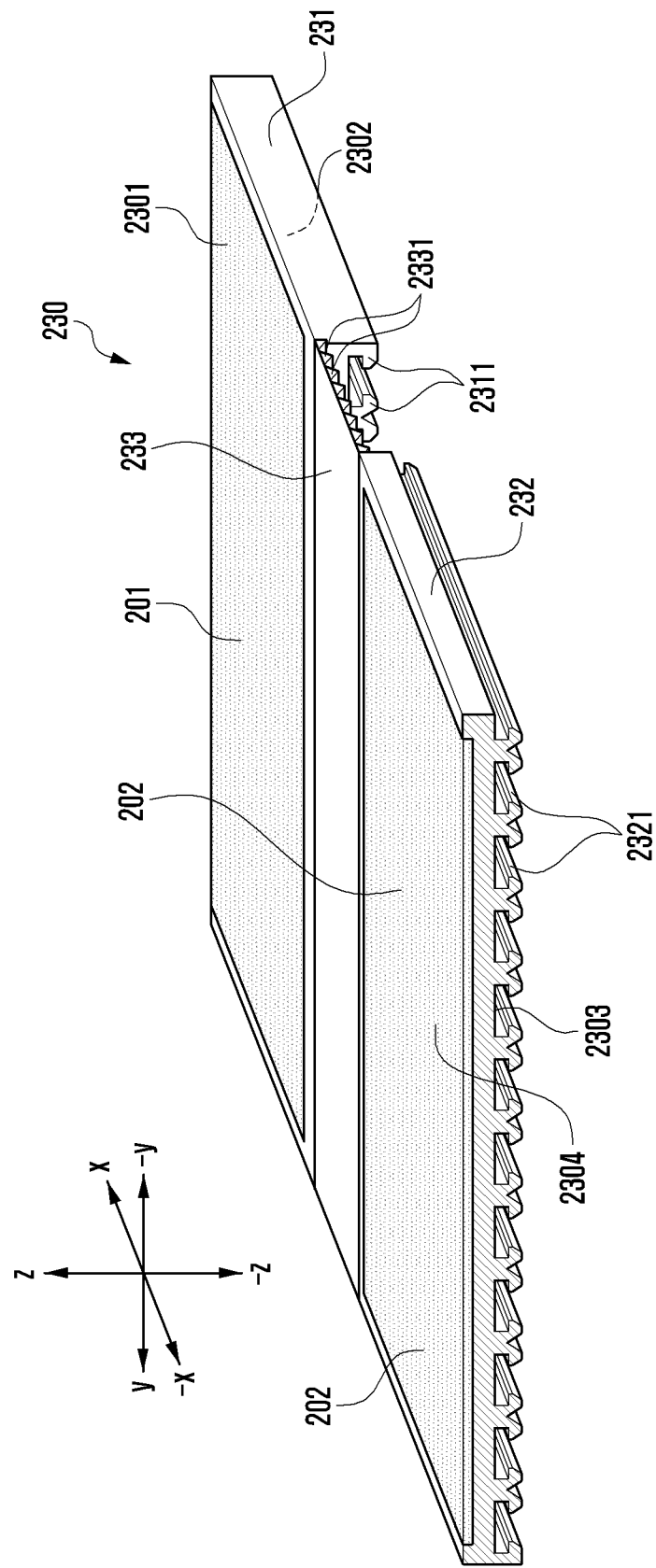
FIGS. 5A and 5B are partial perspective views of the state in which a first sheet and a second sheet according to certain embodiments of the present disclosure have been coupled together, which is viewed from the front and the back.
Figure 5B:
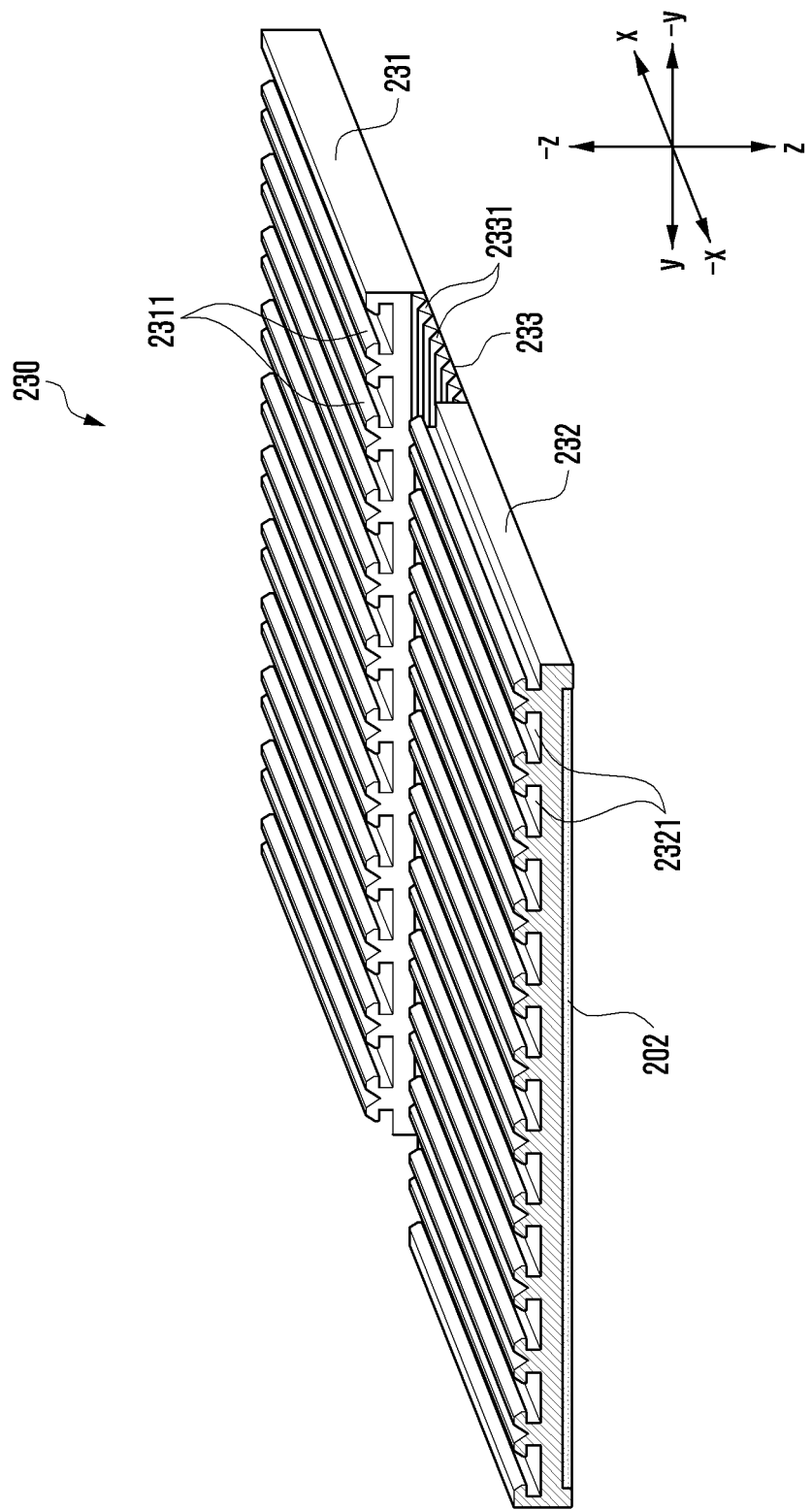
Figure 5C:
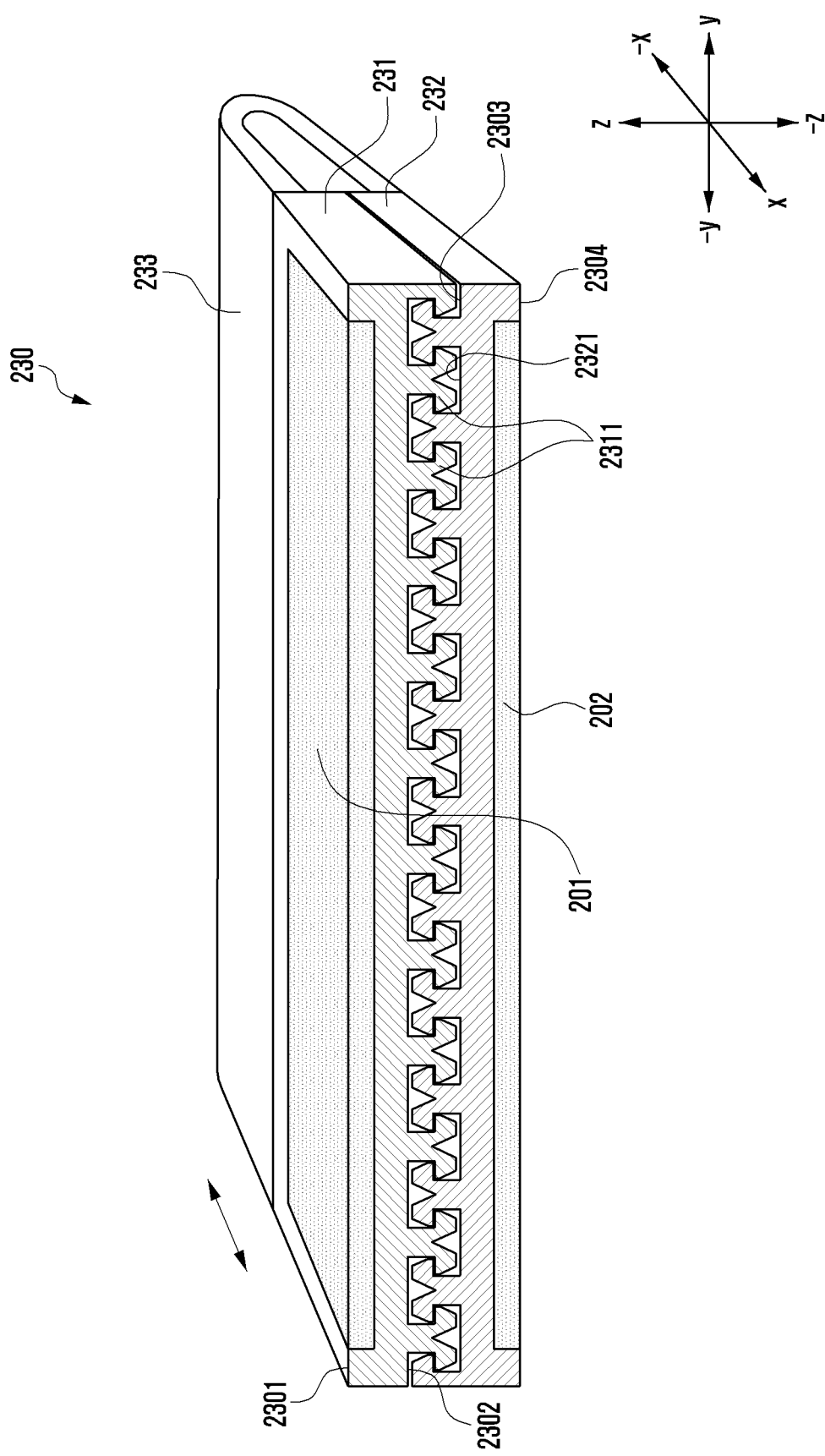
FIG. 5C is a cross-section perspective view of the display module which is viewed from line 5c-5c in FIG. 4 according to certain embodiments of the present disclosure.

FIG. 4 is a perspective view of a display module according to certain embodiments of the present disclosure. FIGS. 5A and 5B are partial perspective views of the state in which a first sheet and a second sheet according to certain embodiments of the present disclosure have been coupled together, which is viewed from the front and the back. FIG. 5C is a cross-section perspective view of the display module which is viewed from line 5c-5c in FIG. 4 according to certain embodiments of the present disclosure.

A display module 230 in FIGS. 4 to 5C may be substantially the same as the first display module 230 in FIG. 2A. Furthermore, a second display module 230-1, a third display module 230-2 and a fourth display module 230-3 in FIG. 2A may also have substantially the same configuration.

Referring to FIGS. 4 to 5C, the display module 230 (e.g., the first display module 230 in FIG. 2A) may include a first sheet 231 including a first surface 2301 facing a first direction (e.g., a z axis direction) and a second surface 2302 facing a direction opposite to the first surface 2301, a second sheet 232 including a third surface 2303 coupled with the second surface 2302 and a fourth surface 2304 toward a direction (e.g., a −z axis direction) opposite to the third surface 2303, a connection unit 233 connecting one end of the first sheet 231 and one end of the second sheet 232, a first flexible display 201 disposed to be viewable from the outside in at least a part of the first surface 2301, a second flexible display 202 disposed to be viewable from the outside in at least a part of the fourth surface 2304, and a sheet fixing member 234 fixing the other end of the first sheet 231 and the other end of the second sheet 232 and disposed in the connection cylinder 2210 in such a way as to be attachable thereto and detachable therefrom. According to an embodiment, the first sheet 231 and the second sheet 232 may be formed of a bendable material. For example, the first sheet 231 and the second sheet 232 may be made of at least one of rubber, silicon or urethane. In an embodiment, the first sheet 231 and the second sheet 232 may be formed as a structure in which a plurality of individual cells made of at least one of polymer, metal or glass is coupled together in such a way as to be flowable relative to one another. According to an embodiment, the sheet fixing member 234 may be formed as a rigid body for preventing deformation when affixed to the connection cylinder 221 in such a way as to be attachable thereto and detachable therefrom. According to an embodiment, the sheet fixing member 234 may be made of a polymer.

According to certain embodiments, the first sheet 231 and the second sheet 232 may include a coupling structure in which the second surface 2302 and the third surface 2303 are in direct contact with each other, and remain movable in a slippage direction (e.g., an x axis direction and a −x axis direction) with respect to each other, in order to accommodate a shear slippage during bending of the device. According to an embodiment, with respect to the coupling structure in which the two sheets 231 and 232 move in the slippage direction (e.g., the x axis direction and the −x axis direction), the first sheet 231 may include at least one guide rib 2311 formed in and protruding from the first surface 2301. According to an embodiment, the at least one guide rib 2311 may extend lengthwise in the slippage direction (e.g., the x axis direction and the −x axis direction). According to an embodiment, the second sheet 232 may include at least one guide groove 2321 depression formed in the third surface 2303, which may accommodate coupling with the at least one guide rib 2311. According to an embodiment, the at least one guide groove 2321 may be formed to extend lengthwise in the a slippage direction (e.g., the x axis direction and the −x axis direction). In an embodiment, the at least one guide rib 2311 may be formed in the third surface 2303 of the second sheet 232, and the at least one guide groove 2321 may be formed in the second surface 2302 of the first sheet 231. According to an embodiment, the first sheet 231 and the second sheet 232 may be coupled together such that the at least one guide rib 2311 is inserted into the at least one guide groove 2321. According to an embodiment, the first sheet 231 and the second sheet 232 may be formed of a material having a certain elasticity. In such a case, the at least one guide rib 2311 may be coupled with the at least one guide groove 2321 in a force-fitting way.

According to certain embodiments, the connection unit 233 may be coupled with one end of the first sheet 231 and one end of the second sheet 232, and may be made of a bendable material capable of accommodating the amount of movement of the first sheet 231 and the second sheet 232 when they move in opposite directions (e.g., the x axis direction and the −x axis direction) in response to bending of the display module 230. According to an embodiment, the connection unit 233 may be made of at least one of rubber, silicon or urethane. According to an embodiment, in order to provide stiffness and flexibility, the connection unit 233 may include a plurality of protrusions 2331 formed at designated intervals. According to an embodiment, the first sheet 231 and the connection unit 233 may form substantially the same plane (e.g., omitting any steps) upon coupling. According to an embodiment, the second sheet 232 and the connection unit 233 may form substantially the same plane (e.g., omitting any steps) upon coupling. In an embodiment, the first sheet 231, the connection unit 233 and the second sheet 232 may be integrally formed. In an embodiment, the connection unit 233 may be integrally formed with the first sheet 231 or the second sheet 232.

According to certain embodiments, the sheet fixing member 234 may be formed to affix the other end of the first sheet 231 and the other end of the second sheet 232 together, and to provide a coupling structure that is attachable to and detachable from the connection cylinder 221. According to an embodiment, the sheet fixing member 234 may include a plurality of connectors 2341 and 2342. According to an embodiment, the plurality of connectors 2341 and 2342 may be disposed to be symmetrical to each other at proper locations of the front and back of the sheet fixing member 234, so that the flexible displays 201 and 202 are inducted to be electrically connected to at least one electronic part (e.g., the electronic part 2212 in FIG. 6) disposed in an internal space (e.g., the internal space 2201 in FIG. 6) of the connection cylinder 221 regardless of a direction in which the sheet fixing member 234 mounted on the connection cylinder 221 is mounted.

According to certain embodiments, the first flexible display 201 may be disposed on the first surface 2301 of the first sheet 231 in such a way as to be attached through an adhesive. According to an embodiment, a material having an adhesive characteristic (e.g., an elastic modulus) may be utilized for the adhesive, for at least partially accommodating a movement in a slippage direction (e.g., the x axis direction and the −x axis direction) of the first sheet, resultant from the bending of the display module 230. According to an embodiment, the second flexible display 202 may be attached to the fourth surface 2304 of the second sheet 232 through an adhesive in the same manner. In an embodiment, the first sheet 231 and the second sheet 232 may be replaced with one single bendable sheet. In such a case, the first flexible display 201 may be attached to the front of the unit sheet through an adhesive, and the second flexible display 202 may be attached to the back thereof opposite to the front of the unit sheet through an adhesive.

Figure 5D:
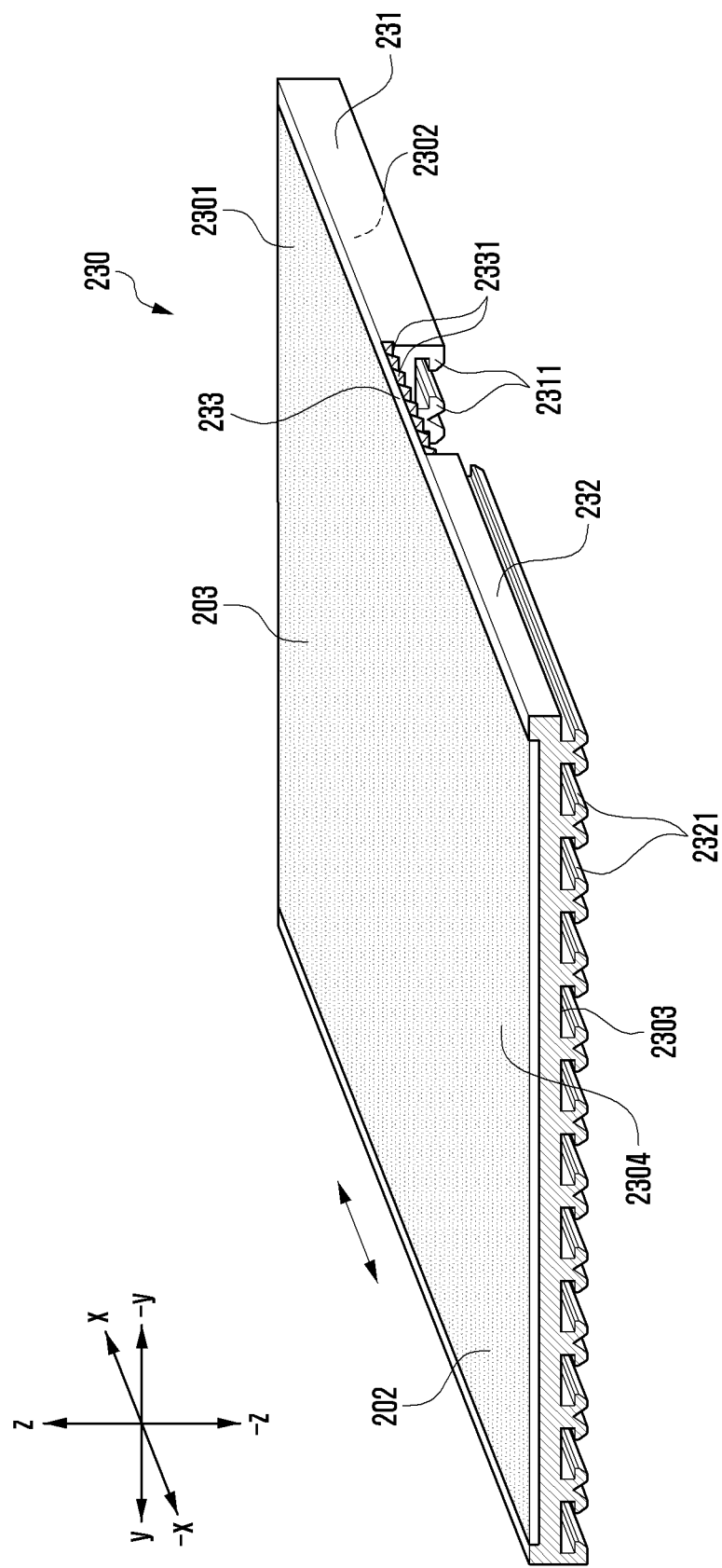
FIG. 5D is a partial perspective view of the display module according to certain embodiments of the present disclosure.

FIG. 5D is a partial perspective view of the display module according to certain embodiments of the present disclosure.

Referring to FIG. 5D, the display module 230 may include the first sheet 231, and the second sheet 232 connected to the first sheet 2310 through the connection unit 233 as described above. According to an embodiment, the display module 230 may include one flexible display 203 disposed from at least a part of the first sheet 231 to at least a part of the second sheet 232 through the connection unit 233. In such a case, the flexible display 203 may be attached to the first surface 2301 of the first sheet 231 and the fourth surface 2304 of the second sheet 232 through an adhesive, and may not be attached to the connection unit 233. In an embodiment, the first sheet 231 and the second sheet 232 may be replaced with one single bendable sheet. In such a case, the flexible display 203 may be disposed on a front of the unit sheet, curve over a side edge thereof, and extend yet further to also be disposed on a back of the unit sheet. For example, the flexible display 203 may accommodate at least a part of a shear movement of the flexible display 203 according to the disposition of the single sheet by curving around the edge of the single sheet, including consideration for an isolation margin.

Figure 6:
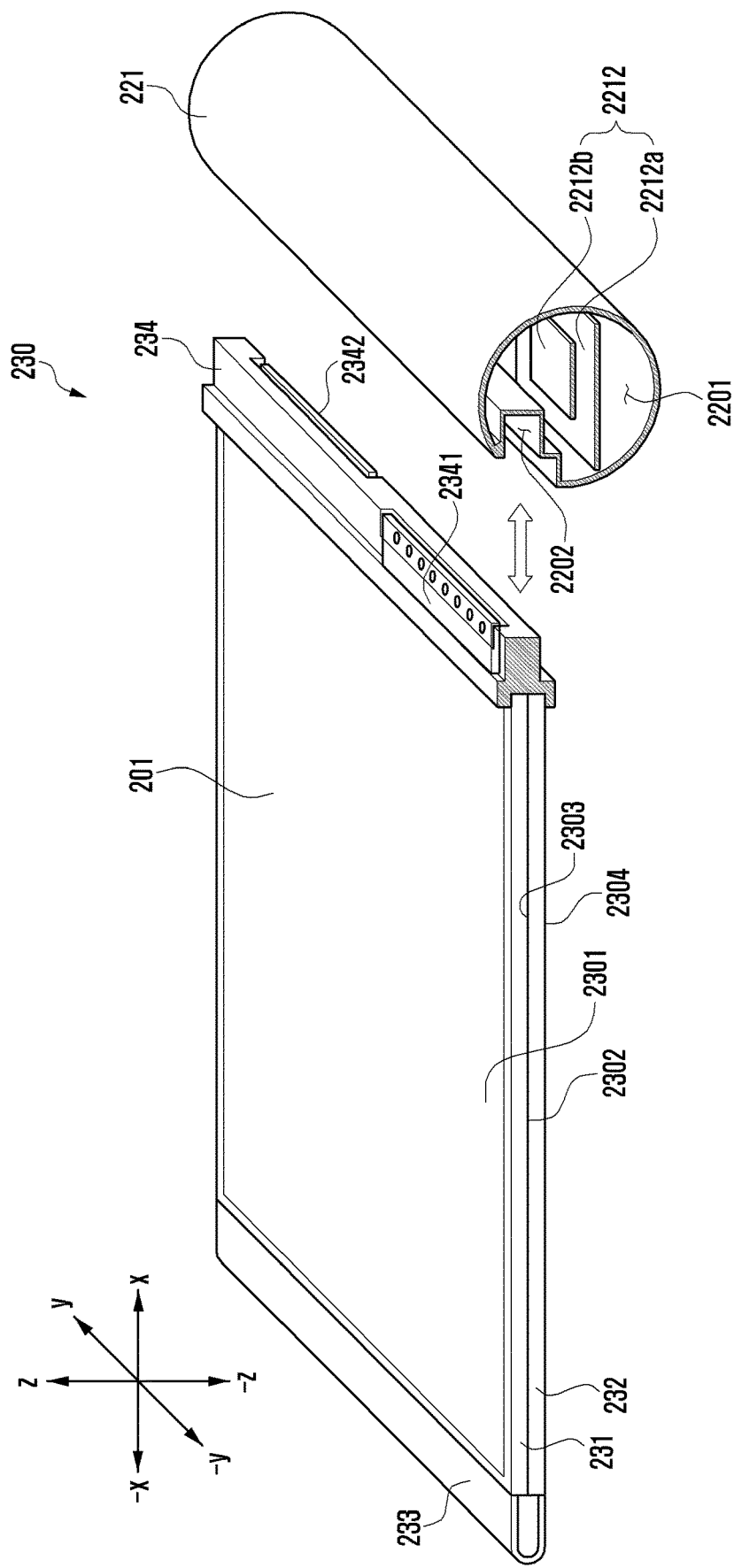
FIG. 6 is a separated perspective view of a display module and a connection cylinder according to certain embodiments of the present disclosure.

FIG. 6 is a separated perspective view of a display module and a connection cylinder according to certain embodiments of the present disclosure.

In describing a display module 230 of FIG. 6, substantially the same elements as those of the display module 230 of FIG. 4 are assigned the same reference numerals, and a detailed description thereof may be omitted.

Referring to FIG. 6, the display module 230 may include a first sheet 231, a second sheet 232 stacked on the first sheet 231 in such a way as to allow slippage thereon so that the second sheet 232 and the first sheet 231 face each other, a connection unit 233 connecting the first sheet 231 and the second sheet 232, a first flexible display 201 disposed on the first sheet 231, a second flexible display 202 disposed on the second sheet 232, and a sheet fixing member 234 fixing the first sheet 231 and the second sheet 232 together. According to an embodiment, the sheet fixing member 234 may have a coupling shape which may be coupled with a member coupling groove 2202 formed in a connection cylinder 221 in such a way as to be attachable thereto and detachable therefrom.

According to certain embodiments, the connection cylinder 221 may include at least one electronic part 2212 disposed in the hollow type internal space 2201. According to an embodiment, the at least one electronic part 2212 is a substrate 2212a and an electric element 2212b or a module disposed on the substrate 2212a, and may include at least one of at least one processor, at least one battery, a display driving circuit, at least one sensor module, at least one camera module or a memory. According to an embodiment, the connection cylinder 221 may include at least one conductive terminal (not illustrated) exposed to the member coupling groove 2202. The at least one conductive terminal may be electrically connected to the substrate 2212a in the internal space 2201. According to an embodiment, when a part of the sheet fixing member 234 of the display module 230 is coupled with the member coupling groove 2202 of the connection cylinder 221 in such a way as to be inserted therein, at least one connector 2341 or 3342 and the at least one conductive terminal are connected, so that the at least one electronic part 2212 of the connection cylinder 221 may be electrically connected to the flexible displays 201 and 202.

Figure 7A:
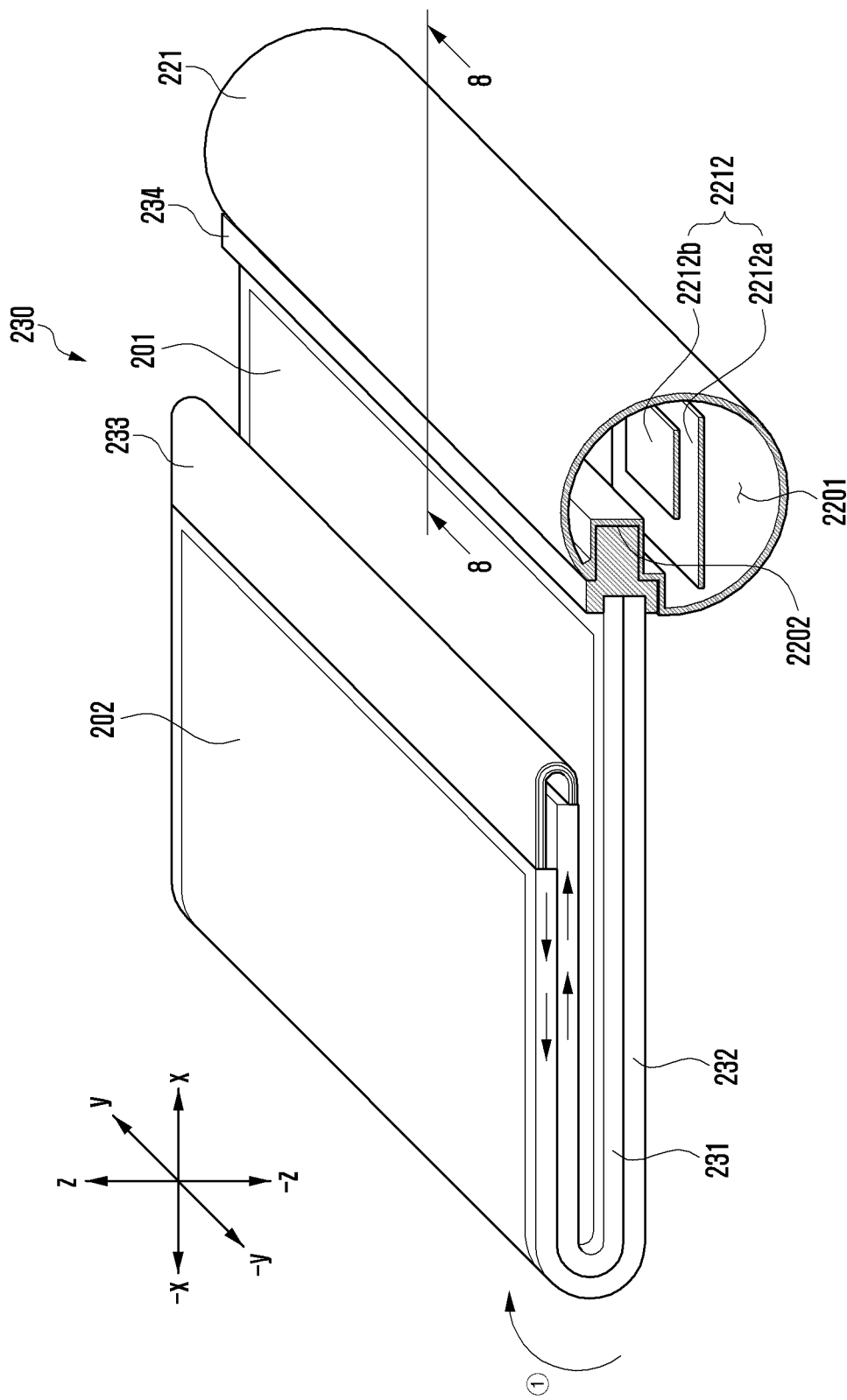
FIGS. 7A and 7B are perspective views of a display module, which illustrate different bending states of a display according to certain embodiments of the present disclosure.
Figure 7B:
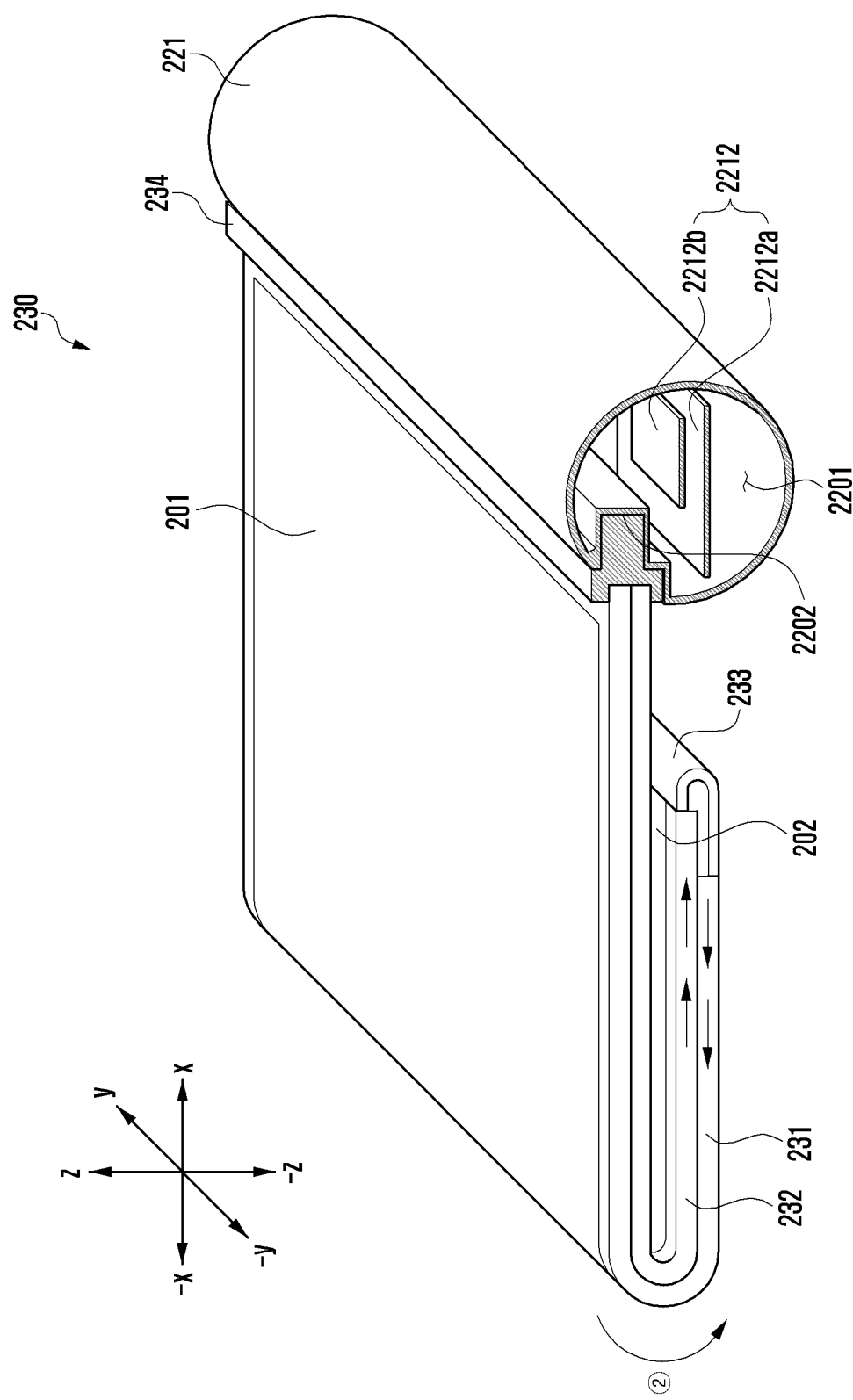

FIGS. 7A and 7B are perspective views of a display module, which illustrate different bending states of a display according to certain embodiments of the present disclosure.

In describing the display module 230 and the connection cylinder 221 in FIGS. 7A and 7B, substantially the same elements as those of the display module 230 and the connection cylinder 221 in FIG. 4 or 6 are assigned the same reference numerals, and a detailed description thereof may be omitted.

Referring to FIG. 7A, when the display module 230 is partially bent upwards (e.g., in a direction ①), the first sheet 231 and the second sheet 232 may experience a shear slippage due to differences in the amount of curvature within the bending portion in an area between connection units 233. For example, the first sheet 231 may move in an x axis direction due to greater curvature of the bending portion, and the second sheet 232 may move in a −x axis direction due to lesser relative curvature of the bending portion, resulting in shear slippage. In such a case, the first sheet 231 and the second sheet 232 may move in opposite directions. A smooth bending operation of the display module 230 may be implemented by accommodating for the amount of such movement through the flexible structure of the connection unit 233.

Referring to FIG. 7B, when the display module 230 is partially bent downwards (e.g., a direction ②), the first sheet 231 and the second sheet 232 may again experience shear slippage due to differences in the amount of curvature of a bending portion in an area between the connection units 233. For example, the first sheet 231 may move in the −x axis direction due to a lesser curvature of the bending portion, and the second sheet 232 may move in the x axis direction due to a greater curvature of the bending portion, resulting in shear slippage. In such a case, the first sheet 231 and the second sheet 232 may move in opposite directions. A smooth bending operation of the display module 230 may be induced because the amount of such a movement is accommodated through the flexible structure of the connection unit 233.

Figure 8:
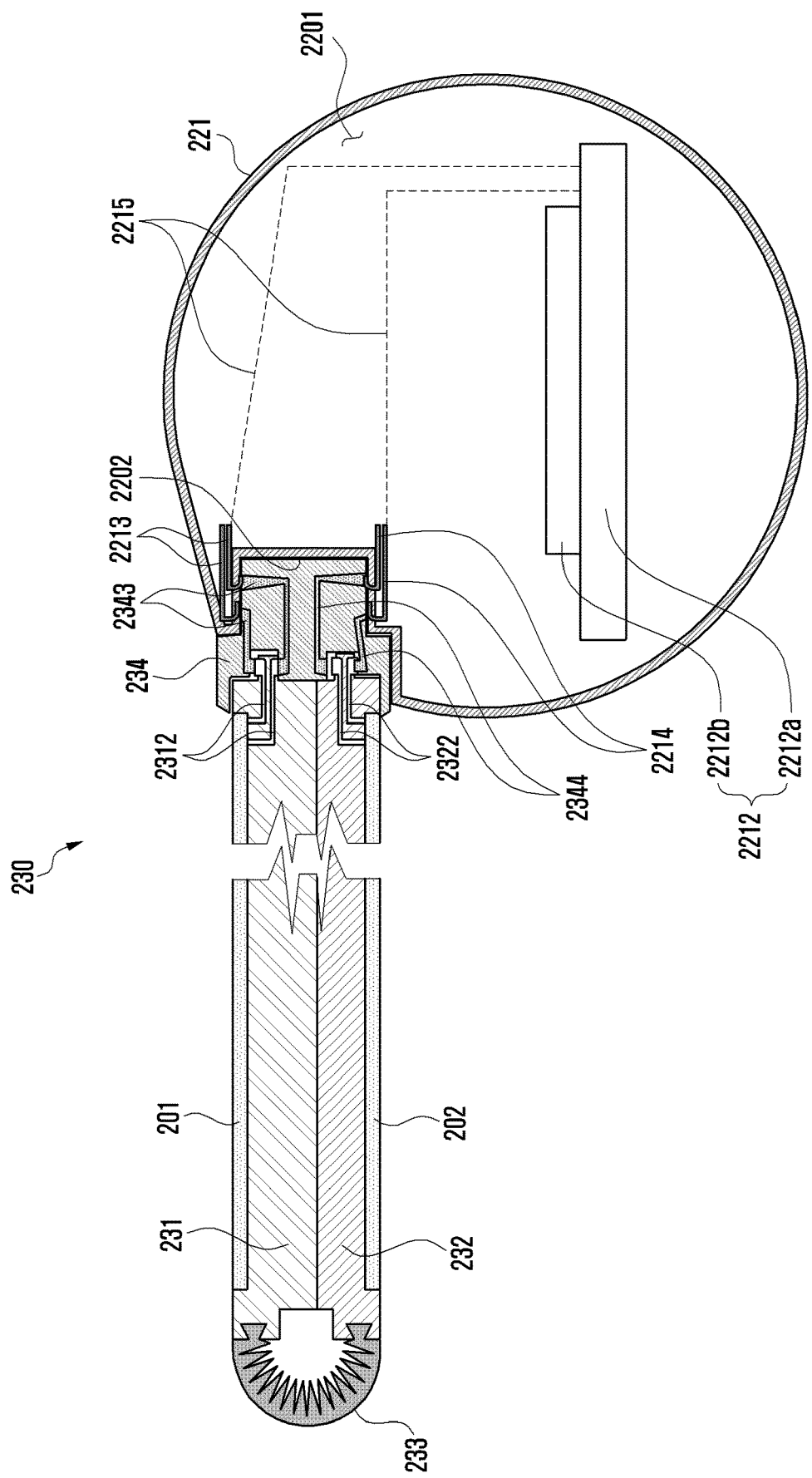
FIG. 8 is a partial cross-sectional view illustrating an electrical connection structure of the display module and a connection cylinder, which is viewed along line 8-8 in FIG. 7A according to certain embodiments of the present disclosure.

FIG. 8 is a partial cross-sectional view illustrating an electrical connection structure of the display module and the connection cylinder, which is viewed along line 8-8 in FIG. 7A according to certain embodiments of the present disclosure.

Referring to FIG. 8, the display module 230 may include the first sheet 231, the second sheet 232 stacked on the first sheet 231 in a way allowing slippage thereon, so that the second sheet 232 and the first sheet 231 face each other, the connection unit 233 connecting the first sheet 231 and the second sheet 232, the first flexible display 201 disposed on the first sheet 231, the second flexible display 202 disposed on the second sheet 232, and the sheet fixing member 234 fixing the first sheet 231 and the second sheet 232 together. According to an embodiment, the sheet fixing member 234 may include a coupling shape which may facilitate coupling with the member coupling groove 2202 formed in the connection cylinder 221, in such a way as to be attachable thereto and detachable therefrom.

According to certain embodiments, the first flexible display 201 may be electrically connected to a first conductive terminal 2343 that is exposed to a connector (e.g., the first connector 2341 or the second connector 2342 in FIG. 6) of the sheet fixing member 234 through a first wiring structure 2312 embedded in the first sheet 231. According to an embodiment, the second flexible display 202 may be electrically connected to a second conductive terminal 2344 exposed to a connector (e.g., the first connector 2341 or the second connector 2342 in FIG. 6) of the sheet fixing member 234 through a second wiring structure 2322 embedded in the second sheet 232. According to an embodiment, the first wiring structure 2312 and the second wiring structure 2322 may include a conductive pattern and/or a conductive via disposed in the first sheet 231 and the second sheet 232. According to an embodiment, the connection cylinder 221 may include a third conductive terminal 2213 and a fourth conductive terminal 2214 exposed to the member coupling groove 2202. According to an embodiment, the third conductive terminal 2213 and the fourth conductive terminal 2214 may be electrically connected to the substrate 2212a disposed as the electronic part 2212 through an electrical connection member 2215 (e.g., FPCB) in the internal space 2201 of the connection cylinder 221.

According to certain embodiments, when the sheet fixing member 234 of the display module 230 is coupled with the member coupling groove 2202 of the connection cylinder 221, the first conductive terminal 2343 electrically connected to the first flexible display 201 may be electrically connected to the third conductive terminal 2213 exposed to the member coupling groove 2202 through a connector (e.g., the first connector 2341 or the second connector 2342 in FIG. 6). At the same time, the second conductive terminal 2344 electrically connected to the second flexible display 202 may be electrically connected to the fourth conductive terminal 2214 exposed to the member coupling groove 2202 through a connector (e.g., the first connector 2341 or the second connector 2342 in FIG. 6). For example, when the display module 230 is coupled with the connection cylinder 221, the first flexible display 201 may be electrically connected to the substrate 2212a through the first wiring structure 2312, the first conductive terminal 2343, the third conductive terminal 2213, and the electrical connection member 2215. Likewise, the second flexible display 202 may be electrically connected to the substrate 2212a through the second wiring structure 2322, the second conductive terminal 2344, the fourth conductive terminal 2214, and the electrical connection member 2215. Accordingly, the first flexible display 201 and the second flexible display 202 may operate by being supplied with a power and control signal through the at least one electronic part 2212 disposed in the internal space 2201 of the connection cylinder 221.

Figure 9:
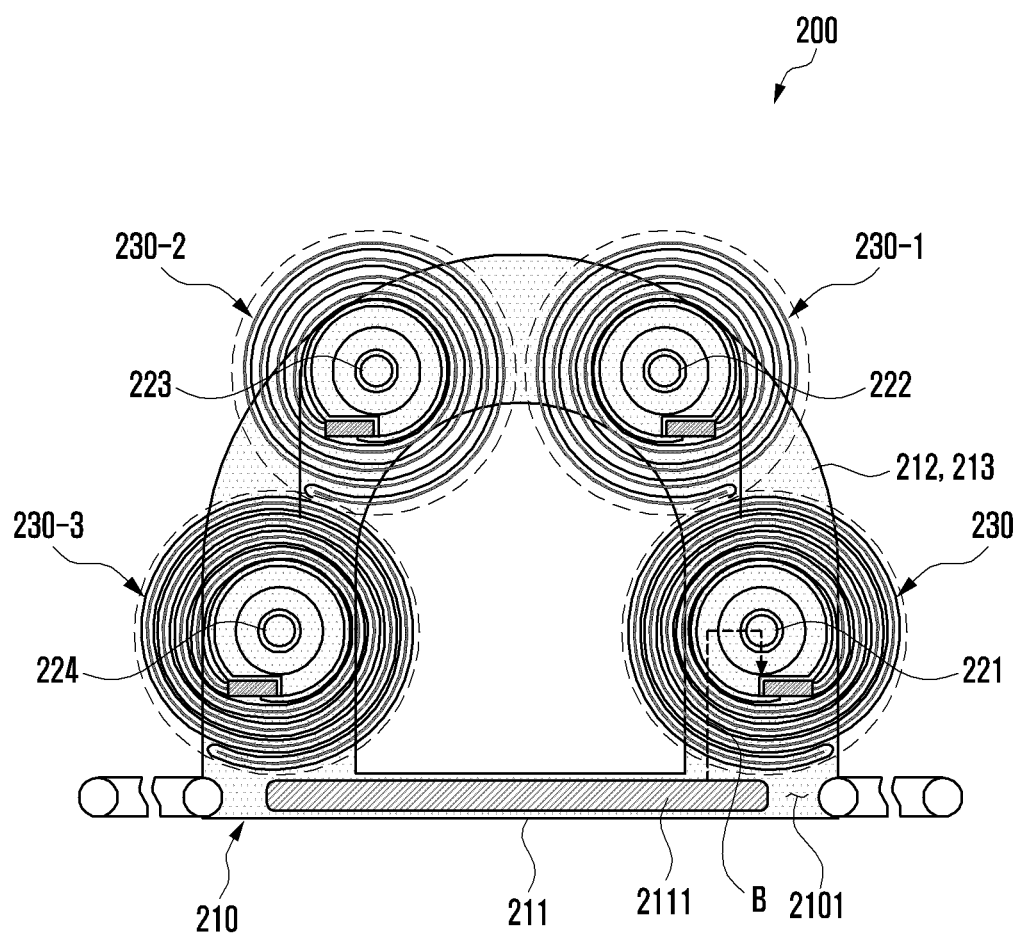
FIG. 9 is a configuration diagram of the electronic device, which schematically illustrates the state in which the display module has been coupled with a binder structure according to certain embodiments of the present disclosure.

FIG. 9 is a configuration diagram of the electronic device, which schematically illustrates the state in which the display module has been coupled with a binder structure according to certain embodiments of the present disclosure.

An electronic device 200 of FIG. 9 may be at least partially similar to the electronic device 200 of FIGS. 2A to 2D or may further include other embodiments of the electronic device.

Referring to FIG. 9, the electronic device 200 may include a binder structure 210, a plurality of connection cylinders 221, 222, 223, and 224 coupled with the binder structure 210 in such a way as to be attachable thereto and detachable therefrom, and a plurality of display modules 230, 230-1, 230-2, and 230-3 coupled with the plurality of connection cylinders 221, 222, 223, and 224 in such a way as to be attachable thereto and detachable therefrom. According to an embodiment, the binder structure 210 may include a body 211, and support units 212 and 213 coupled with the body 211 and rotatably supporting the plurality of connection cylinders 221, 222, 223, and 224. According to an embodiment, the binder structure 210, the plurality of connection cylinders 221, 222, 223, and 224 and/or the plurality of display modules 230, 230-1, 230-2, and 230-3 may functionally operate in conjunction with one another via electrical connection through an electrical connection structure B. For example, the plurality of display modules 230, 230-1, 230-2, and 230-3 may be electrically connected to the plurality of connection cylinders 221, 222, 223, and 224 through the support units 212 and 213 from the internal space 2101 of the body 211. Accordingly, the plurality of display modules 230, 230-1, 230-2, and 230-3 may be controlled by or provided with power from the at least one electronic part 2212 disposed in the internal space 2101 of the body 211 through the electrical connection structure B. In an embodiment, the electronic device 200 may include a first cover assembly (e.g., the first cover assembly 240 in FIG. 2A) and a second cover assembly (e.g., the second cover assembly 250 in FIG. 2A) disposed in the body 211 in such a way as to be foldable. In such a case, at least one electronic part (e.g., the acoustic module 206, the at least one sensor module 204 or the at least one camera module 205 in FIG. 2A) disposed in the first cover assembly (e.g., the first cover assembly 240 in FIG. 2A) and the second cover assembly (e.g., the second cover assembly 250 in FIG. 2A)

may also be configured to be controlled by the at least one electronic part 2111 disposed in the body 211 through a separate additional electrical connection structure.

Figure 10A:
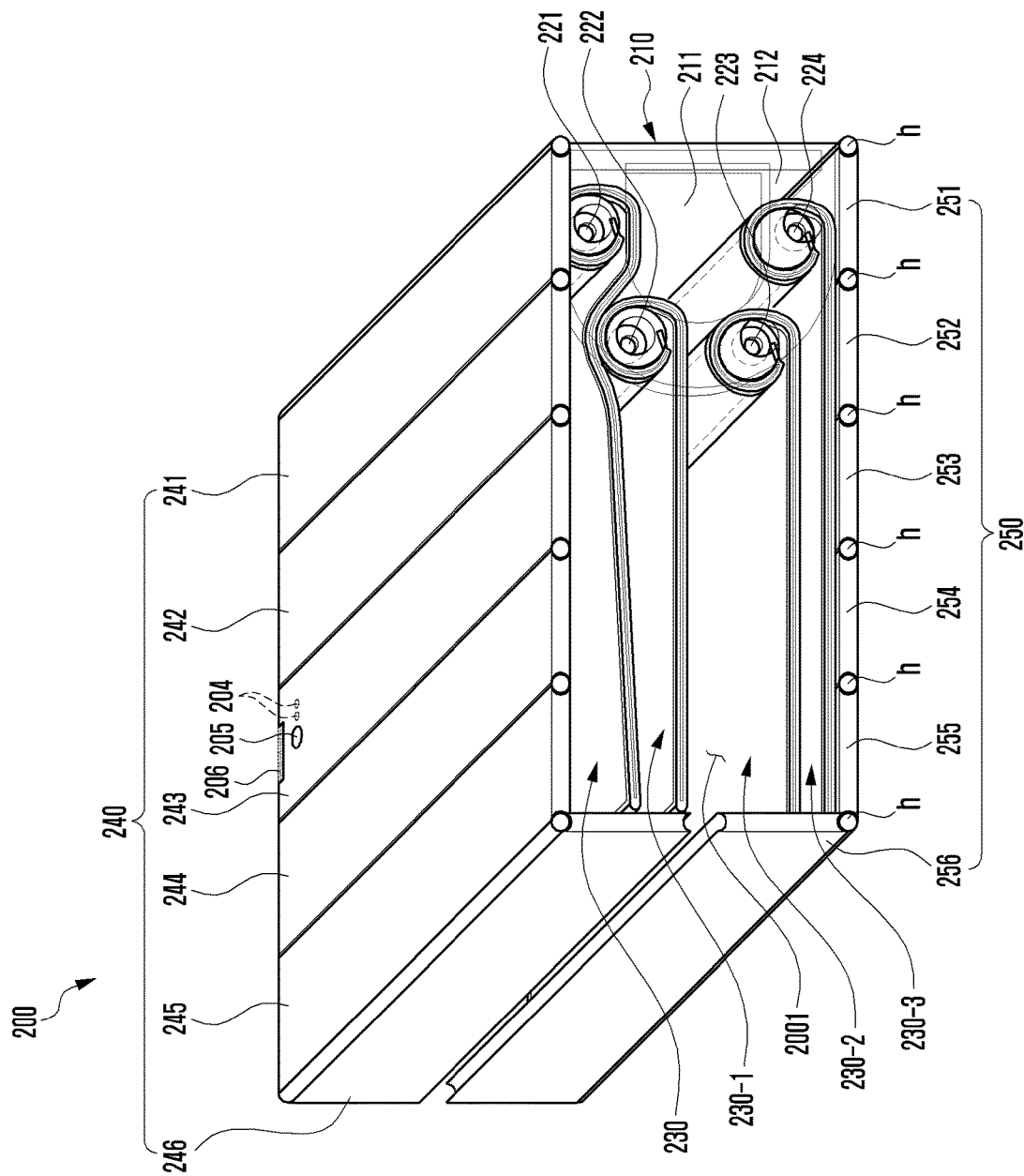
FIGS. 10A, 10B and 10C are perspective views of the electronic device, which illustrate various deformation states according to certain embodiments of the present disclosure.
Figure 10B:
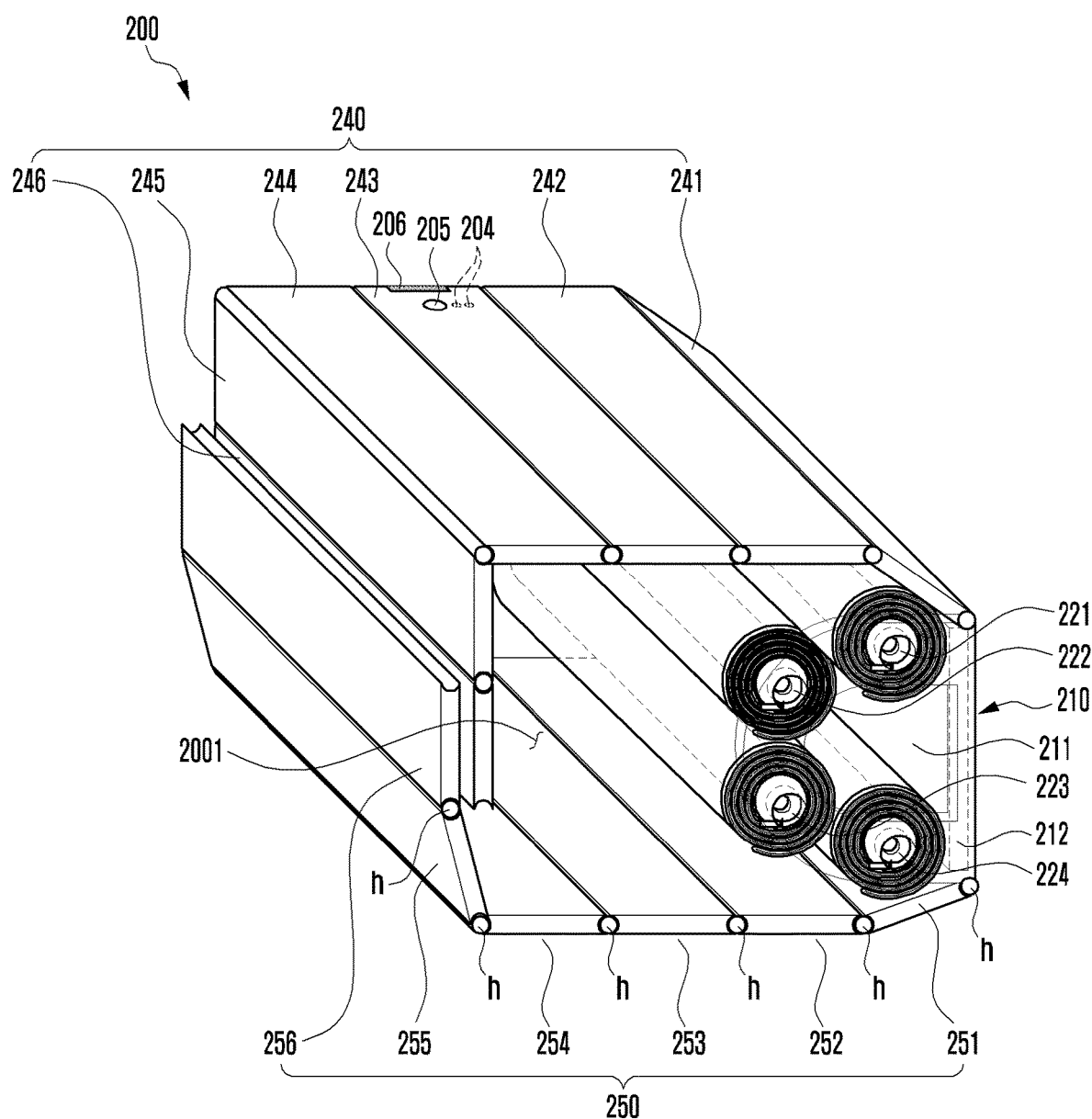
Figure 10C:
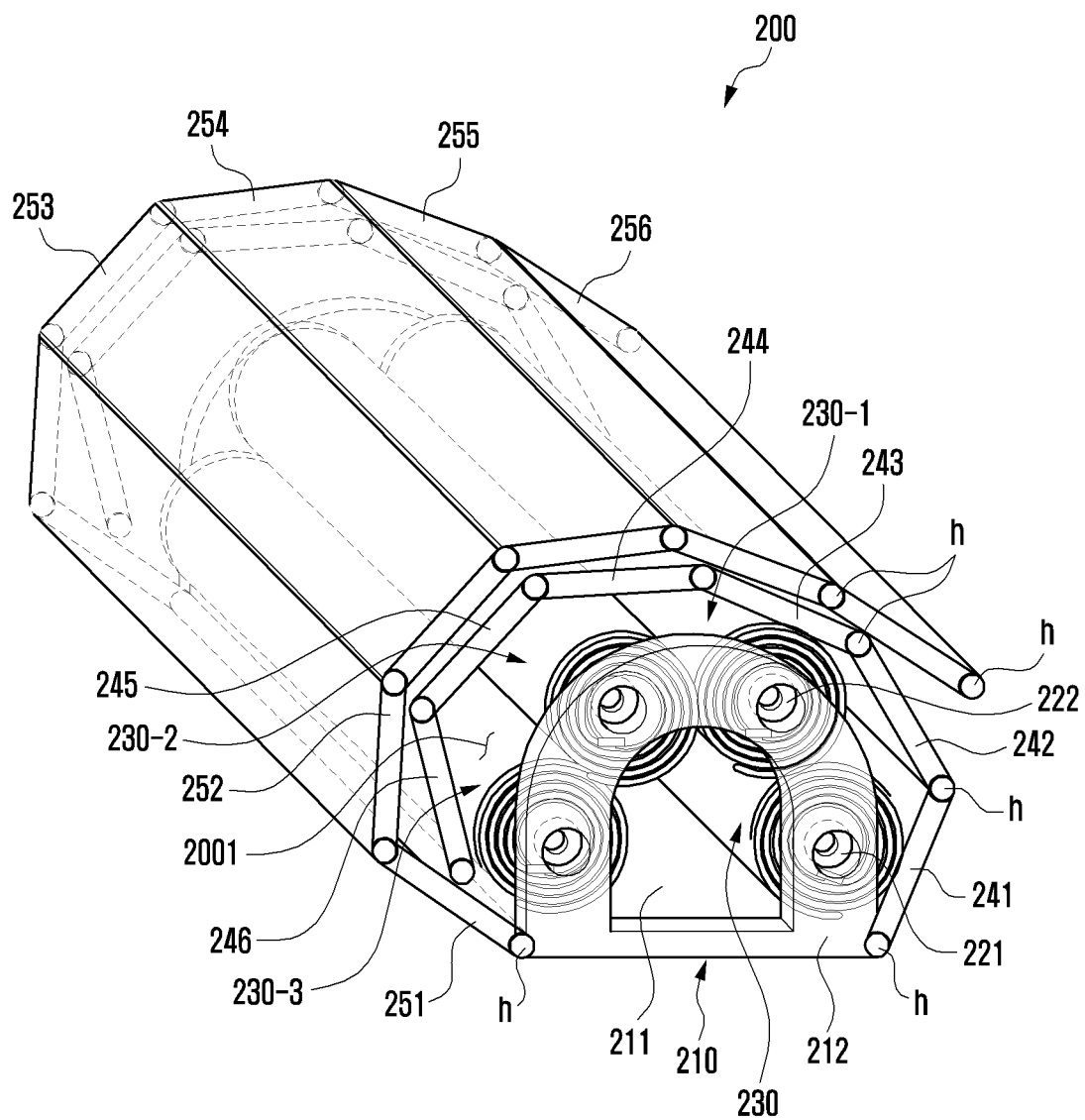

FIGS. 10A to 10C are perspective views of the electronic device, which illustrate various deformation states according to certain embodiments of the present disclosure.

In describing the electronic device of FIGS. 10A to 10C, substantially the same elements as those of the electronic device of FIGS. 2A to 2D are assigned the same reference numerals, and a detailed description thereof may be omitted.

Referring to FIG. 10A, as a sixth unit cover 246 of a first cover assembly 240, a twelfth unit cover 256 of a second cover assembly 250 are folded to face each other, a plurality of display modules 230, 230-1, 230-2, and 230-3 may be generally covered through a binder structure 210 and a formed space 2001 as to be protected therein.

Referring to FIG. 10B, as a fifth unit cover 245 and sixth unit cover 246 of the first cover assembly 240 and an eleventh unit cover 255 and twelfth unit cover 256 of the second cover assembly 250 are folded to face each other, the plurality of display modules 230, 230-1, 230-2, and 230-3 may be generally covered through the binder structure 210 and the formed space 2001 as to be protected therein. In such a case, the fifth unit cover 246 and the twelfth unit cover 256 may be disposed to overlap with each other.

Referring to FIG. 10C, as a plurality of first unit covers 241, 242, 243, 244, 245, and 246 of the first cover assembly 240 and a plurality of second unit covers 251, 252, 253, 254, 255, and 256 of the second cover assembly 250 may be folded at designated angles with respect to one another, and some unit covers may be disposed in a way to overlap with one another, such that a plurality of display modules 230, 230-1, 230-2, and 230-3 can be covered and protected within a space 2001 formed via the folding of the first cover assembly 240 and the second cover assembly 250.

Figure 11A:
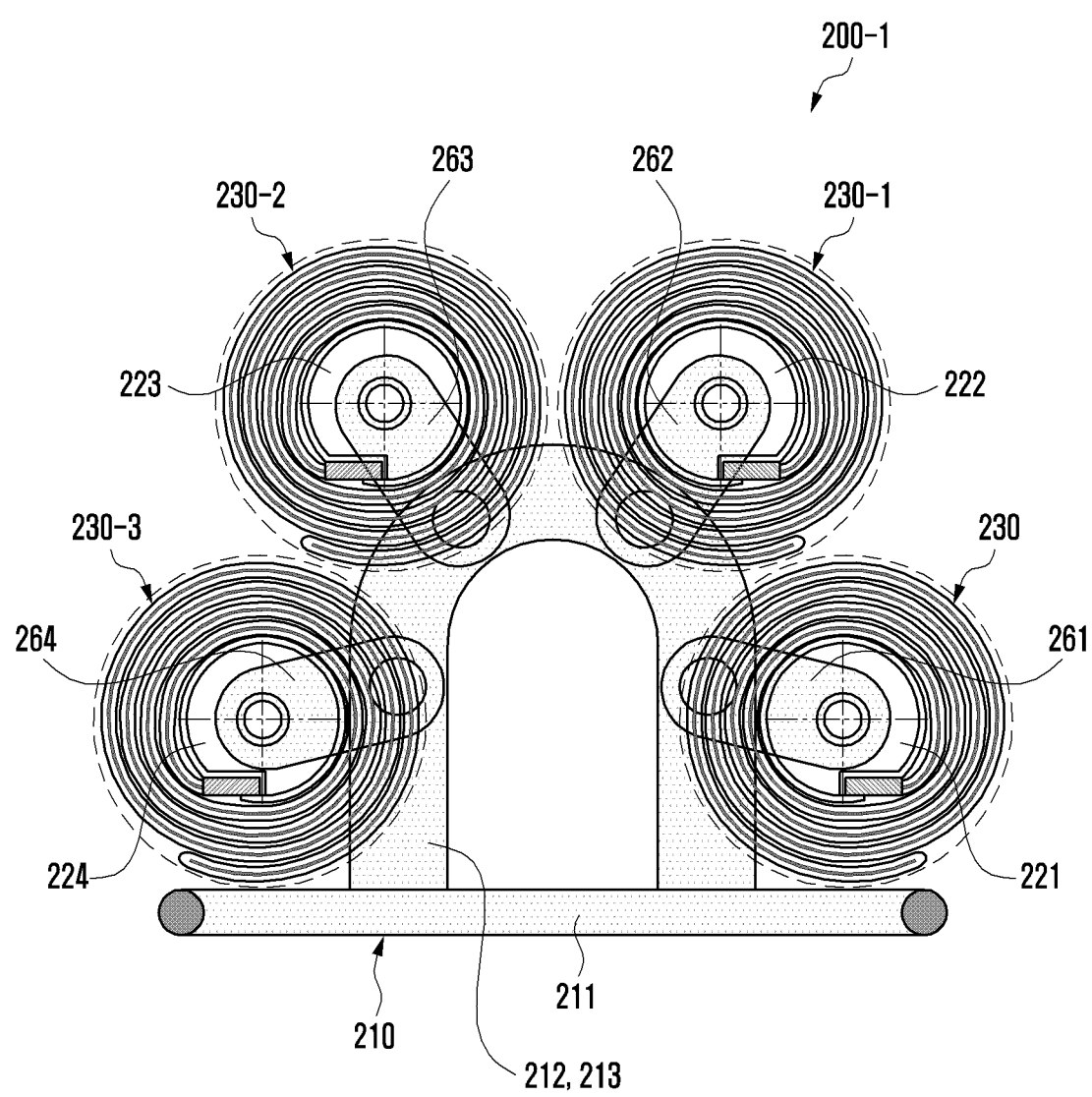
FIGS. 11A and 11B are diagrams schematically illustrating a configuration of an electronic device according to certain embodiments of the present disclosure.
Figure 11B:
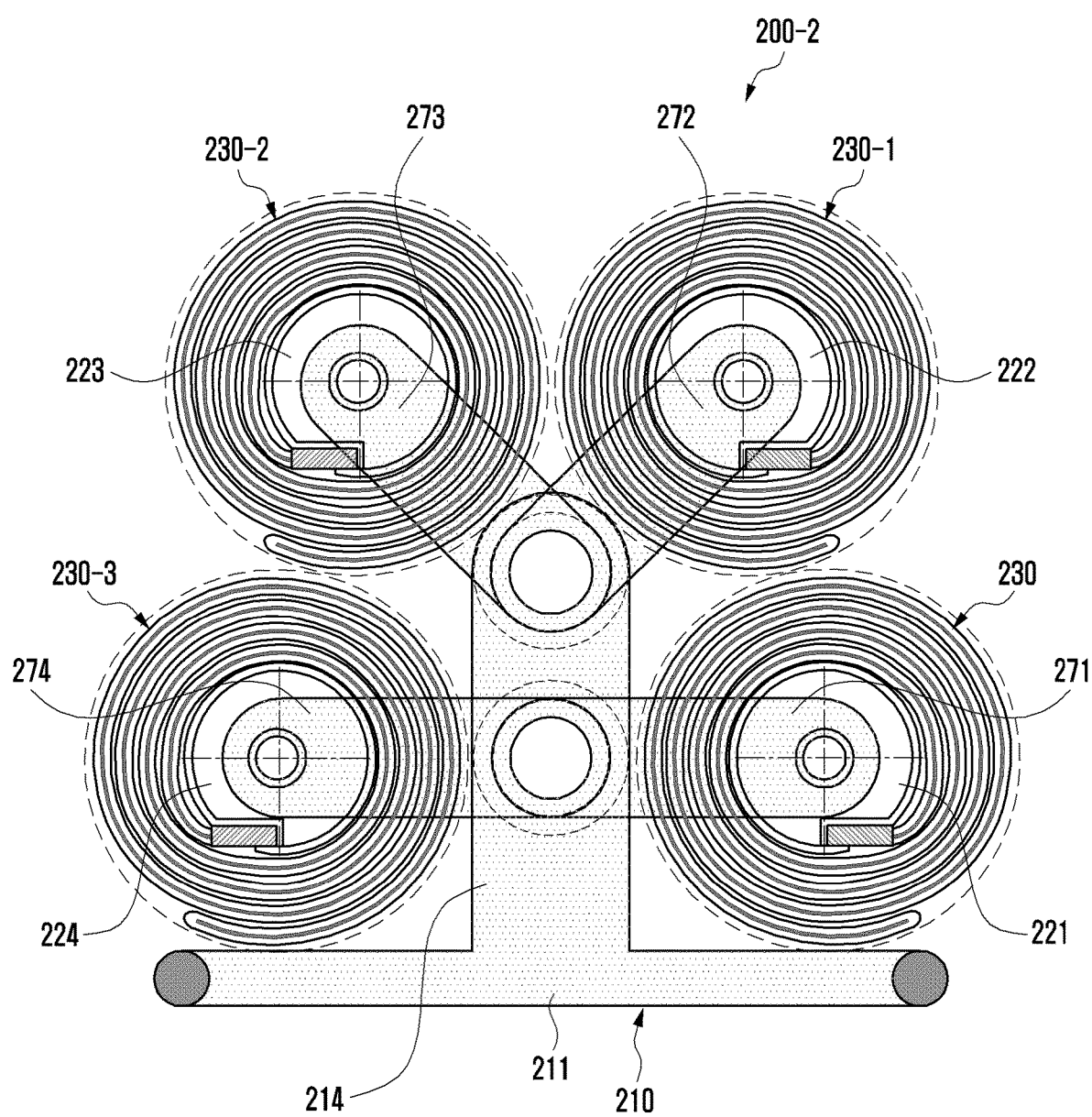

FIGS. 11A and 11B are diagrams schematically illustrating a configuration of an electronic device according to certain embodiments of the present disclosure.

In describing electronic devices 200-1 and 200-2 of FIGS. 11A and 11B, substantially the same elements as those of the electronic device 200 of FIG. 9 are assigned the same reference numerals, and a detailed description thereof may be omitted.

Referring to FIG. 11A, the electronic device 200-1 may include a binder structure 210, a plurality of connection cylinders 221, 222, 223, and 224 coupled with the binder structure 210 in such a way as to be attachable thereto and detachable therefrom, and a plurality of display modules 230, 230-1, 230-2, and 230-3 coupled with the plurality of connection cylinders 221, 222, 223, and 224 in such a way as to be attachable thereto and detachable therefrom. According to an embodiment, the binder structure 210 may include a body 211, support units 212 and 213 coupled with the body 211 and coupled with the plurality of connection cylinders 221, 222, 223, and 224, and a plurality of connection links 261, 262, 263, and 264 connecting the support units 212 and 213 and the plurality of connection cylinders 221, 222, 223, and 224. According to an embodiment, the first connection cylinder 221 may be disposed to autonomously rotate through the first link member 261 and to have its location moved at a designated angle through the support units 212 and 213. Substantially in the same manner, the second connection cylinder 222, the third connection cylinder 223, and the fourth connection cylinder 224 may also be disposed to be supported through the second link member 262, the third link member 263, and the fourth link member 264. According to an embodiment, the plurality of link members 261, 262, 263, and 264 may be disposed to be rotated at different locations of the support units 212 and 213.

Referring to FIG. 11B, the electronic device 200-2 may include a binder structure 210, a plurality of connection cylinders 221, 222, 223, and 224 coupled with the binder structure 210 in such a way as to be attachable thereto and detachable therefrom, and a plurality of display modules 230, 230-1, 230-2, and 230-3 coupled with the plurality of connection cylinders 221, 222, 223, and 224 in such a way as to be attachable thereto and detachable therefrom. According to an embodiment, the binder structure 210 may include a body 211, a support unit 214 coupled with the body 211 and extending from a surface of the body 211 to couple with the plurality of connection cylinders 221, 222, 223, and 224, and a plurality of connection links 271, 272, 273, and 274 connecting the support unit 214 and the plurality of connection cylinders 221, 222, 223, and 224. According to an embodiment, the first connection cylinder 221 may be disposed to autonomously rotate through the first link member 271 and to have its location moved at a designated angle through the support unit 214. Substantially in the same manner, the second connection cylinder 222, the third connection cylinder 223, and the fourth connection cylinder 224 may also be disposed to be supported through the second link member 272, the third link member 273, and the fourth link member 274. According to an embodiment, some of the plurality of link members 271, 272, 273, and 274 may be disposed to be rotated along the same rotation axis at the same location of the support unit 214. For example, the first link member 271 and the fourth link member 274 may be disposed in the support unit in a way to have the same rotation axis, and the second link member 272 and the third link member 273 may also be disposed to have the same rotation axis.

According to certain embodiments, an electronic device may include a binder structure (e.g., the binder structure 210 in FIG. 2A), a plurality of connection cylinders (e.g., the plurality of connection cylinders 221, 222, 223, and 224 in FIG. 2A) coupled with the binder structure in such a way as to be separable therefrom and rotatable therein and including at least one first electronic part (e.g., the electronic part 2212 in FIG. 6) in an internal space (e.g., the internal space 2201 in FIG. 6) therein, and at least one display module (e.g., the plurality of display modules 230, 230-1, 230-2, and 230-3 in FIG. 2A) coupled with at least one of the plurality of connection cylinders in such a way as to be separable therefrom and electrically connected to the at least one first electronic part. The at least one display module (e.g., the display module 230 in FIG. 4) may include a first sheet (e.g., the first sheet 231 in FIG. 4) including a first surface (e.g., the first surface 2301 in FIG. 4) toward a first direction (e.g., the z axis direction in FIG. 4) and a second surface (e.g., the second surface 2302 in FIG. 4) toward a direction (e.g., the −z axis direction in FIG. 4) opposite to the first surface, a second sheet (e.g., the second sheet 232 in FIG. 4) including a third surface (e.g., the third surface 2303 in FIG. 4) coupled with the second surface and a fourth surface (e.g., the fourth surface 2304 in FIG. 4) toward a direction opposite to the third surface, a connection unit (e.g., the connection unit 233 in FIG. 4) connecting one end of the first sheet and one end of the second sheet, a first flexible display (e.g., the first flexible display 201 in FIG. 4) disposed to be viewable from the outside in at least a part of the first surface, a second flexible display (e.g., the second flexible display 202 in FIG. 4) disposed to be viewable from the outside in at least a part of the fourth surface, and a sheet fixing member (e.g., the sheet fixing member 234 in FIG. 4) fixing the other end of the first sheet and the other end of the second sheet and disposed in the connection cylinder in such a way as to be attachable thereto and detachable therefrom. The first sheet and the second sheet may be coupled together in a way to slip with respect to each other in a second direction perpendicular to the first direction (e.g., the x axis direction or the −x axis direction in FIG. 4), and the first flexible display and the second flexible display may be electrically connected to the at least one first electronic part through the sheet fixing member.

According to certain embodiments, the at least one display module may be disposed to be deformable in a rolled state through the connection cylinder or a flat state unrolled from the connection cylinder.

According to certain embodiments, the first sheet may include at least one guide rib protruded and formed in the second surface, the second sheet may include a guide groove formed in the third surface and configured to accommodate the at least one guide rib, and the first sheet and the second sheet may be coupled together in a way to slip in the second direction with respect to each other through a coupling structure of the guide rib and the guide groove.

According to certain embodiments, the second surface and the third surface may be coupled together in a way to come into surface contact with each other.

According to certain embodiments, the connection unit may be made of a bendable material for accommodating a shear slip attributable to the bending of the first sheet and the second sheet.

According to certain embodiments, the connection unit may be made of at least one of rubber, silicon or urethane.

According to certain embodiments, the first flexible display may be attached to the first surface of the first sheet through an adhesive having elasticity for at least partially accommodating slip occurring in the second direction, and the second flexible display may be attached to the fourth surface of the second sheet through an adhesive having elasticity for at least partially accommodating slip occurring in the second direction.

According to certain embodiments, the first sheet and/or the second sheet may be made of bendable polymer.

According to certain embodiments, the first sheet and/or the second sheet may be formed as a structure in which a plurality of individual cells made of at least one of polymer, metal or glass is coupled together in such a way as to be flowable to each other.

According to certain embodiments, the first sheet, the connection unit and the second sheet may be integrally formed.

According to certain embodiments, the binder structure may include a body and a pair of support units protruded and formed at both ends of the body, respectively, and configured to have a plurality of through holes formed therein, and the connection cylinder may include a hinge shaft rotatably coupled with the pair of support units through the plurality of through holes.

According to certain embodiments, the electronic device may further include at least one second electronic part disposed in an internal space of the body and electrically connected to the first electronic part of the connection cylinder through at least one of the pair of support units.

According to certain embodiments, the electronic device may further include a first cover assembly movably coupled with one side of the body and a second cover assembly movably coupled with the other side of the body between the pair of support units. The plurality of connection cylinders rotatably coupled with the support units may be at least partially and selectively covered through the first cover assembly and the second cover assembly.

According to certain embodiments, the first cover assembly may include a plurality of first unit covers each having an internal space and connected together in such a way as to be foldable through hinge devices, and the second cover assembly may include a plurality of second unit covers each having an internal space and connected together in such a way as to be foldable through hinge devices.

According to certain embodiments, the electronic device may further include at least one third electronic part disposed in an internal space of at least some of the plurality of first unit covers, and the at least one third electronic part may be electrically connected to the at least one first electronic part and/or the at least one second electronic part through the binder structure.

According to certain embodiments, at least one of the at least one first electronic part, the at least one second electronic part or the at least one third electronic part may include at least one of a substrate, at least one processor, at least one battery, a display driving circuit, at least one sensor module, at least one camera module or a memory.

According to certain embodiments, an electronic device may include a binder structure, a plurality of connection cylinders coupled with the binder structure in such a way as to be separable therefrom and rotatable therein and including at least one first electronic part in an internal space thereof, and at least one display module coupled with at least one of the plurality of connection cylinders in such a way as to be separable therefrom and electrically connected to the at least one first electronic part. The at least one display module may include a first sheet including a first surface toward a first direction and a second surface toward a direction opposite to the first surface, a second sheet including a third surface coupled with the second surface and a fourth surface toward a direction opposite to the third surface, a connection unit configured to connect one end of the first sheet and one end of the second sheet, a flexible display supported by at least a part of the fourth surface through the connection unit from at least a part of the first surface and disposed to be viewable from an outside, and a sheet fixing member configured to fix another end of the first sheet and another end of the second sheet and disposed in the connection cylinder in such a way as to be attachable thereto and detachable therefrom. The first sheet and the second sheet may be coupled together in a way to slip with respect to each other in a second direction perpendicular to the first direction. The flexible display may be electrically connected to the at least one first electronic part through the sheet fixing member.

According to certain embodiments, the first sheet may include the at least one guide rib protruded and formed in the second surface, the second sheet may include a guide groove formed in the third surface and configured to accommodate the at least one guide rib, and the first sheet and the second sheet may be coupled together in a way to slip in the second direction with respect to each other through a coupling structure of the guide rib and the guide groove.

According to certain embodiments, the second surface and the third surface may be coupled together in a way to come into surface contact with each other.

According to certain embodiments, the first sheet, the connection unit and the second sheet may be integrally formed.

Furthermore, the embodiments of the disclosure disclosed in this specification and drawings have merely presented specific examples in order to easily describe technical contents according to the embodiments of the disclosure and to help understanding of the embodiments of the disclosure, but are not intended to limit the scope of the embodiments of the disclosure. Accordingly, all changes or modified forms derived should be construed as being included in the scope of certain embodiments of the disclosure in addition to the embodiments disclosed herein.

What is claimed is:

1. An electronic device, comprising:
a binder structure including a body and a pair of support units having a U-shape respectfully protruding from both ends of the body and having a plurality of through holes formed therein
a plurality of connection cylinders coupled with the pair of support units so as to be separable from the binder structure, and rotatable within the binder structure,
at least one first electronic part disposed in an internal space defined by the plurality of connection cylinders; and
at least one display module coupled with at least one connection cylinder of the plurality of connection cylinders so as to be separable from the at least one connection cylinder, and electrically connected to the at least one first electronic part,
wherein the at least one display module comprises:
a first sheet including a first surface facing a first direction and a second surface opposite to the first surface;
a second sheet including a third surface coupled with the second surface, and a fourth surface opposite to the third surface;
a connection unit connecting one end of the first sheet and one end of the second sheet;
a first flexible display supported by the first sheet, at least partly visible to an exterior of the device from at least a part of the first surface of the first sheet;
a second flexible display supported by the second sheet, at least partly visible to an exterior of the device from at least a part of the fourth surface of the second sheet; and
a sheet fixing member fixing another end of the first sheet and another end of the second sheet, and disposed in the internal space of the connection cylinder so as to be attachable thereto and detachable therefrom,
wherein the first sheet is coupled to the second sheet so as to allow slippage therebetween in a second direction perpendicular to a first direction, and
wherein the first flexible display and the second flexible display are electrically connected to the at least one first electronic part through the sheet fixing member.

2. The electronic device of claim 1, wherein the at least one display module is deformable,
wherein the at least one display module is rollable into a rolled state through rolling of the connection cylinder, and rollable into a flat state via unfurling from the connection cylinder, and
wherein when the first sheet and the second sheet are connected via the connection unit and the sheet fixing member, and the second surface of the first sheet and the third surface of the second sheet contacts along an entirety of both the second and third surfaces, the first and second flexible displays are arranged on the at least one display module to be facing opposing directions.

3. The electronic device of claim 1, wherein:
the first sheet includes at least one guide rib protruding from the second surface,
the second sheet includes a guide groove formed in the third surface to accommodate the at least one guide rib, and
the slippage between the first sheet and the second sheet is supported at least partially through coupling of the guide rib and the guide groove.

4. The electronic device of claim 3, wherein the second surface is coupled to the third surface including surface contact therebetween.

5. The electronic device of claim 1, wherein the connection unit includes a bendable material that accommodates shear slippage occurring during bending of the first sheet and the second sheet.

6. The electronic device of claim 5, wherein the connection unit includes at least one of rubber, silicon or urethane.

7. The electronic device of claim 1, wherein:
the first flexible display is attached to the first surface of the first sheet through a first adhesive,
the second flexible display is attached to the fourth surface of the second sheet through a second adhesive,
the first and second adhesives are elastic to at least partially accommodate for slippage occurring along the second direction.

8. The electronic device of claim 1, wherein the first sheet and/or the second sheet include a bendable polymer.

9. The electronic device of claim 1, wherein the first sheet and/or the second sheet include a structure having a plurality of individual cells that are mutually coupled so as to be flowable relative to one another, and
wherein the structure includes at least one of polymer, metal or glass.

10. The electronic device of claim 1, wherein the first sheet, the connection unit and the second sheet are integrally formed.

11. The electronic device of claim 1, wherein:
the connection cylinder includes a hinge shaft rotatably coupled with the pair of support units through the plurality of through holes.

12. The electronic device of claim 11, further comprising:
at least one second electronic part disposed in an internal space of the body and electrically connected to the first electronic part of the connection cylinder through at least one of the pair of support units.

13. The electronic device of claim 12, further comprising:
a first cover assembly movably coupled with one side of the body; and
a second cover assembly movably coupled with another side of the body, and disposed between the pair of support units,
wherein the plurality of connection cylinders is at least partially and selectively covered via the first cover assembly and the second cover assembly.

14. The electronic device of claim 13, wherein:
the first cover assembly includes a plurality of first unit covers each having an internal space, and connected together so as to be foldable through a plurality of hinge devices, and
the second cover assembly includes a plurality of second unit covers each having an internal space and connected together so as to be foldable through hinge devices.

15. The electronic device of claim 14, further comprising at least one third electronic part disposed in an internal space formed among at least some of the plurality of first unit covers, wherein the at least one third electronic part is electrically connected to the at least one first electronic part and/or the at least one second electronic part through the binder structure.

16. The electronic device of claim 15, wherein at least one of the at least one first electronic part, the at least one second electronic part or the at least one third electronic part includes at least one of a substrate, a processor, a battery, a display driving circuit, a sensor module, a camera module or a memory.

17. An electronic device, comprising:
   a binder structure including a body and a pair of support units having a U-shape respectfully protruding from both ends of the body and having a plurality of through holes formed therein;
   a plurality of connection cylinders coupled with the pair of support units so as to be separable from the binder structure, and rotatable within the binder structure,
   a plurality of connection cylinders coupled with the binder structure so as to be separable from the binder structure, and rotatable within the binder structure,
   at least one first electronic part disposed in an internal space defined by the plurality of connection cylinders; and
   at least one display module coupled with at least one cylinder of the plurality of connection cylinders so as to be separable from the at least one cylinder, and electrically connected to the at least one first electronic part,
   wherein the at least one display module comprises:
      a first sheet including a first surface facing a first direction, and a second surface opposite to the first surface;
      a second sheet including a third surface coupled with the second surface, and a fourth surface opposite to the third surface;
      a connection unit connecting one end of the first sheet and one end of the second sheet;
      a flexible display supported by at least a part of the fourth surface, and at least partly viewable to an exterior of the electronic device; and
      a sheet fixing member fixing another end of the first sheet and another end of the second sheet, and disposed in the internal space of the connection cylinder so as to be attachable thereto and detachable therefrom,
   wherein the first sheet is coupled the second sheet so as to allow slippage therebetween in a second direction perpendicular to the first direction, and
   wherein the flexible display is electrically connected to the at least one first electronic part through the sheet fixing member.

18. The electronic device of claim 17, wherein:
   the first sheet includes at least one guide rib protruding from the second surface,
   the second sheet includes a guide groove formed in the third surface, configured to accommodate the at least one guide rib, and
   the slippage between the first sheet and the second sheet is supported at least partially through coupling of the guide rib and the guide groove.

19. The electronic device of claim 17, wherein the second surface is coupled to the third surface including surface contact therebetween.

20. The electronic device of claim 17, wherein the first sheet, the connection unit and the second sheet are integrally formed.

* * * * *